United States Patent
McKibben et al.

(10) Patent No.: US 10,248,609 B2
(45) Date of Patent: Apr. 2, 2019

(54) MODULAR INTERCONNECTION SYSTEM AND COMPONENTS THEREFOR

(71) Applicant: VERIFONE, INC., San Jose, CA (US)

(72) Inventors: Scott William McKibben, Davis, CA (US); Ricardo Ernesto Espinoza-Ibarra, Rocklin, CA (US); Dennis Carr, Roseville, CA (US); Paul Serotta, Roseville, CA (US)

(73) Assignee: VERIFONE, INC., San Jose, CA (US)

( * ) Notice: Subject to any disclaimer, the term of this patent is extended or adjusted under 35 U.S.C. 154(b) by 285 days.

(21) Appl. No.: 14/989,054

(22) Filed: Jan. 6, 2016

(65) Prior Publication Data
US 2017/0192930 A1 Jul. 6, 2017

(51) Int. Cl.
| | | |
|---|---|---|
| *G06F 13/42* | (2006.01) | |
| *G06Q 20/20* | (2012.01) | |
| *G07G 1/14* | (2006.01) | |
| *H04L 12/44* | (2006.01) | |
| *H04L 12/66* | (2006.01) | |
| *G07G 1/00* | (2006.01) | |
| *G07G 1/12* | (2006.01) | |

(52) U.S. Cl.
CPC ....... *G06F 13/4282* (2013.01); *G06Q 20/202* (2013.01); *G07G 1/0018* (2013.01); *G07G 1/12* (2013.01); *G07G 1/14* (2013.01); *H04L 12/44* (2013.01); *H04L 12/66* (2013.01)

(58) Field of Classification Search
None
See application file for complete search history.

(56) References Cited

U.S. PATENT DOCUMENTS

| | | | |
|---|---|---|---|
| 6,697,892 B1 * | 2/2004 | Laity | G06F 13/385 710/314 |
| 2003/0177294 A1 | 9/2003 | Russell | |

(Continued)

FOREIGN PATENT DOCUMENTS

WO          WO 01/04764          1/2001

OTHER PUBLICATIONS

International Search Report and Written Opinion, International Application No. PCT/US2017/012245, dated Apr. 5, 2017, pp. 1-15.

*Primary Examiner* — Henry Tsai
*Assistant Examiner* — Aurangzeb Hassan
(74) *Attorney, Agent, or Firm* — Hunton Andrews Kurth LLP

(57) ABSTRACT

A modular interconnectivity assembly for interconnecting elements of a point of sale system, the modular interconnectivity assembly including at least one interconnectivity module including an Input/Output (I/O) hub having at least one upstream facing port and at least two downstream facing ports, at least one upstream connector connected to the at least one upstream facing port of the (I/O) hub and adapted for communication in accordance with a first communication protocol, at least one downstream connector connected to at least one of the at least two downstream facing ports and adapted for communication in accordance with the first communication protocol and at least one interface connected to another of the at least two downstream facing ports and adapted for communication in accordance with a second communication protocol, different from the first communication protocol.

20 Claims, 17 Drawing Sheets

(56) References Cited

U.S. PATENT DOCUMENTS

| | | | |
|---|---|---|---|
| 2005/0182510 A1* | 8/2005 | Bress | G06F 3/0658 |
| | | | 700/214 |
| 2005/0198406 A1 | 9/2005 | Sichner | |
| 2008/0039007 A1* | 2/2008 | Wu | H04W 88/08 |
| | | | 455/3.01 |
| 2008/0222325 A1* | 9/2008 | Ishino | G05B 19/054 |
| | | | 710/60 |

* cited by examiner

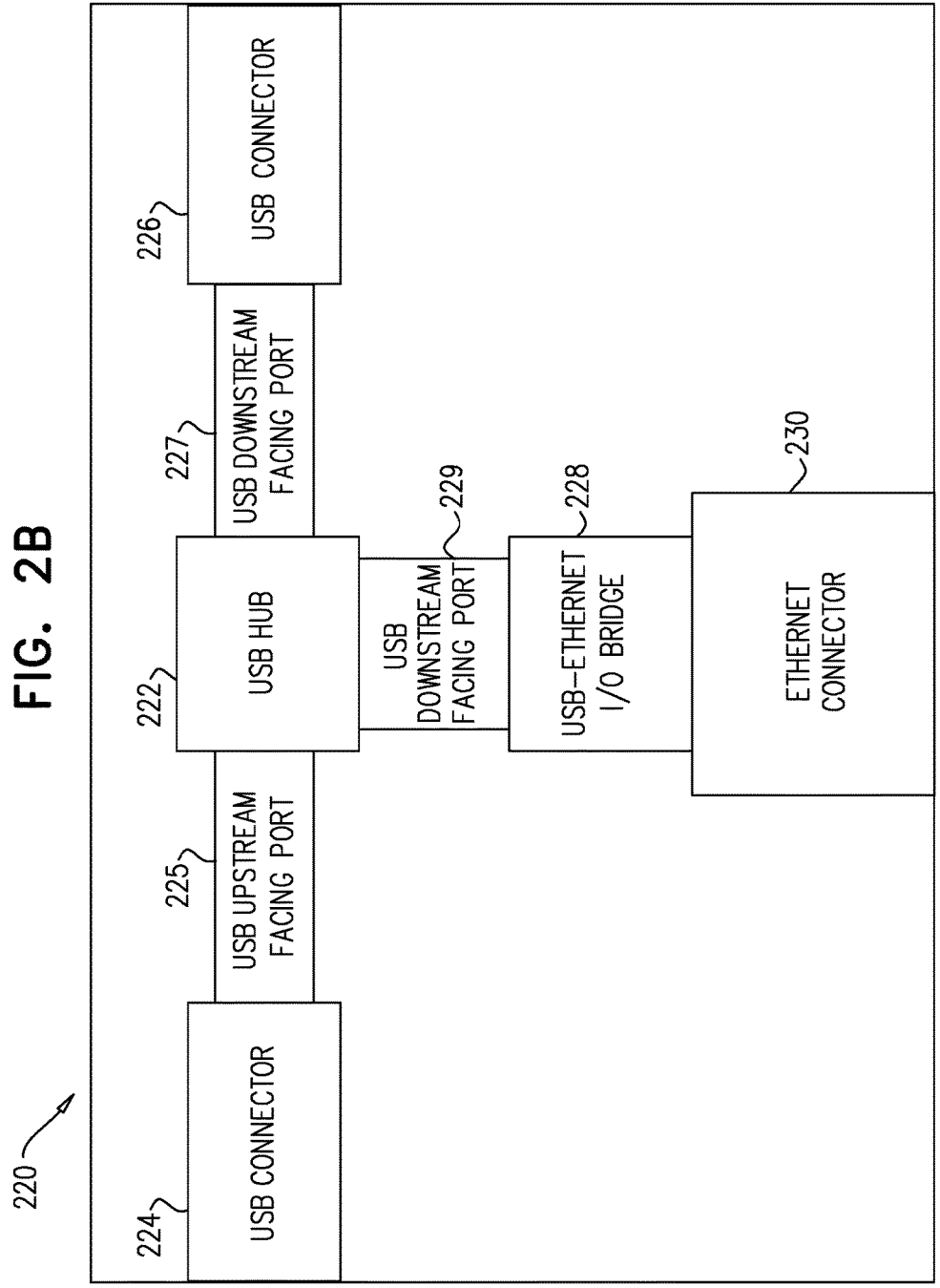

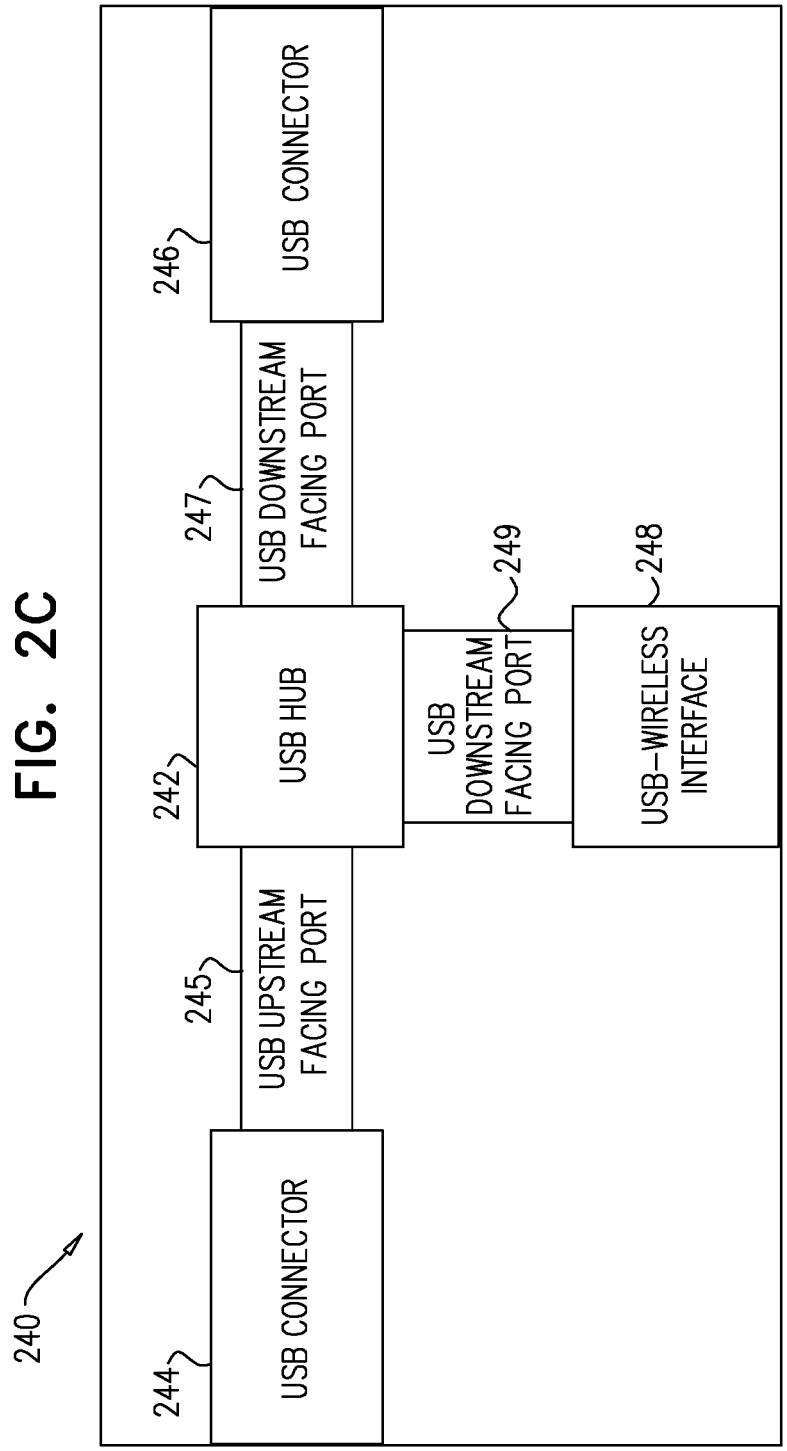

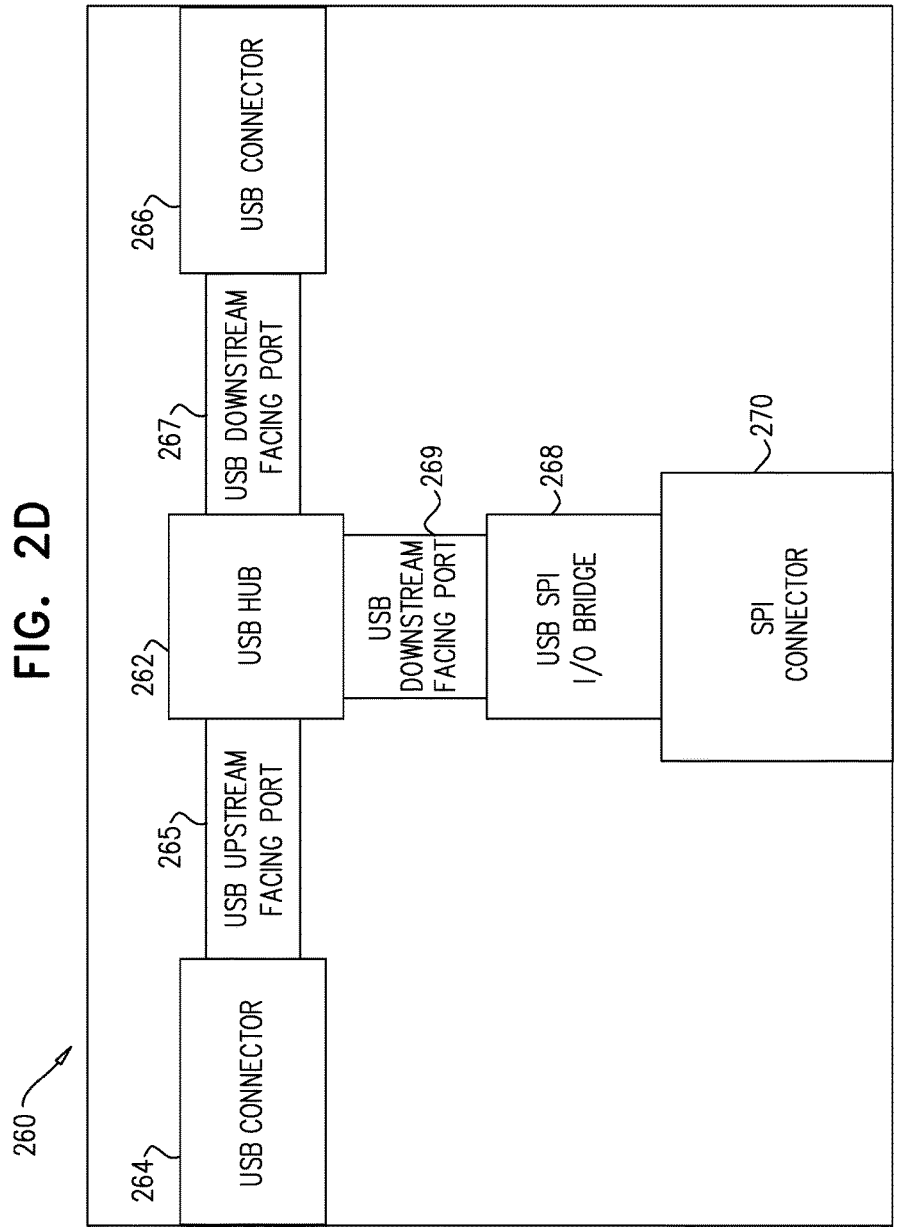

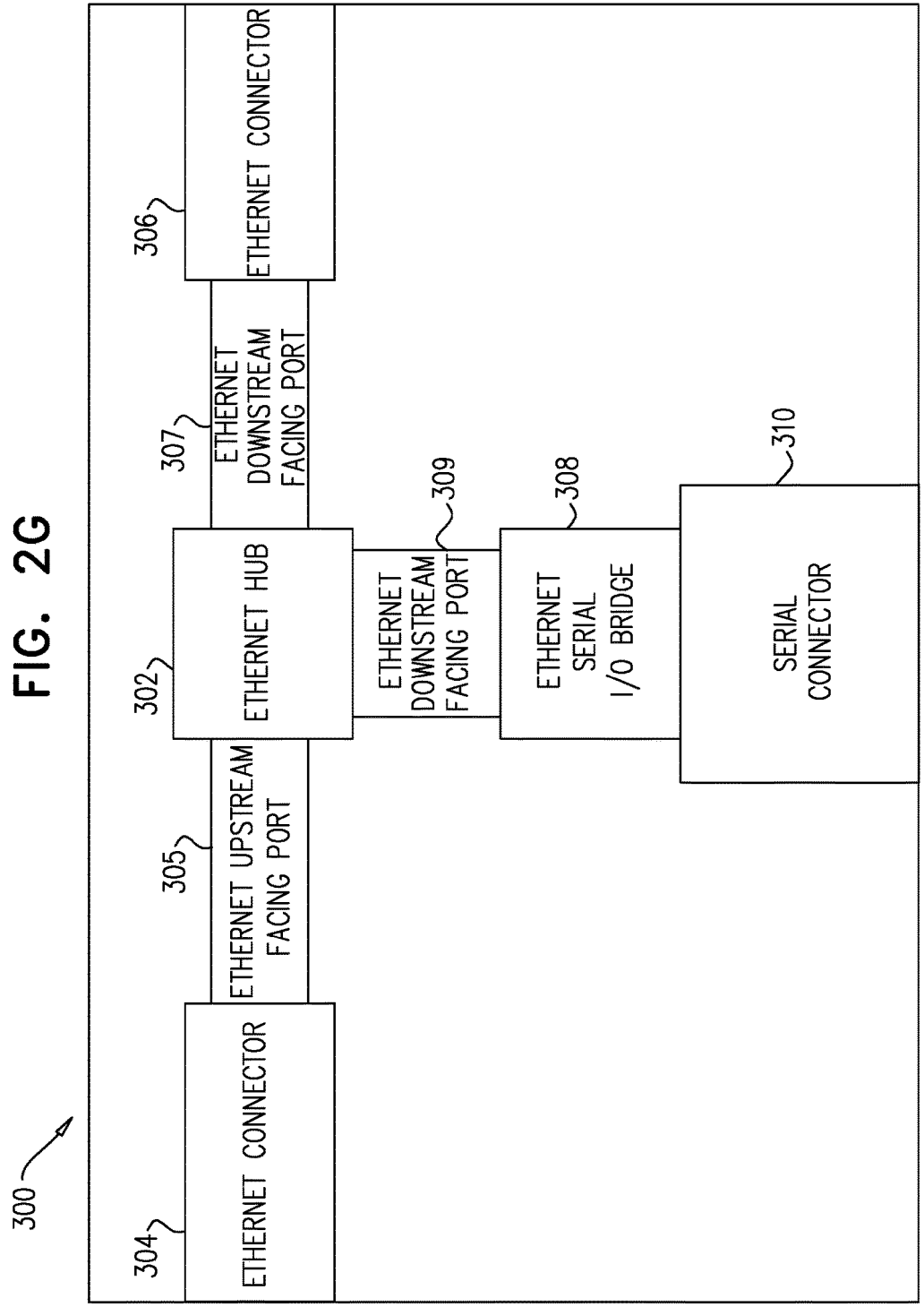

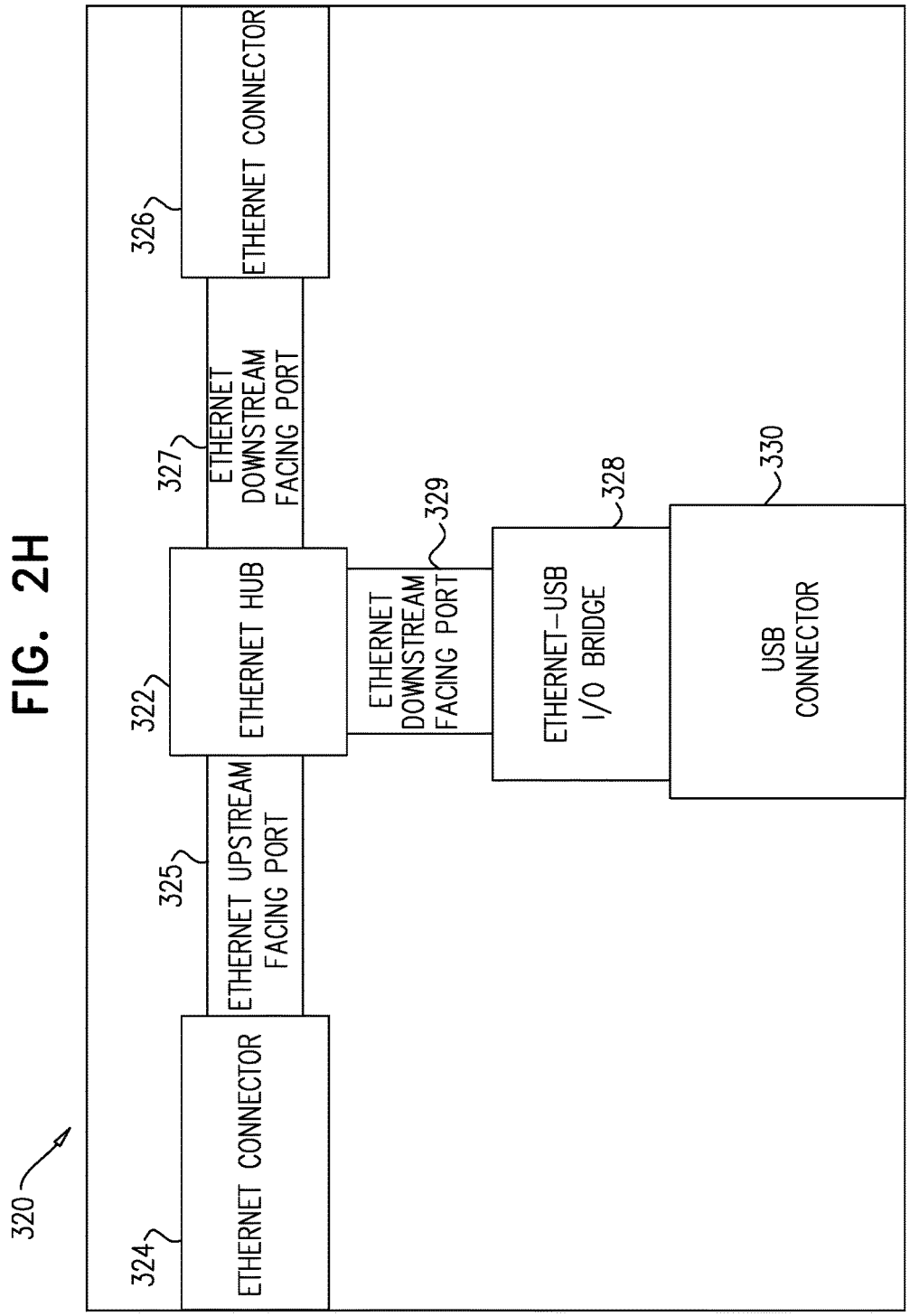

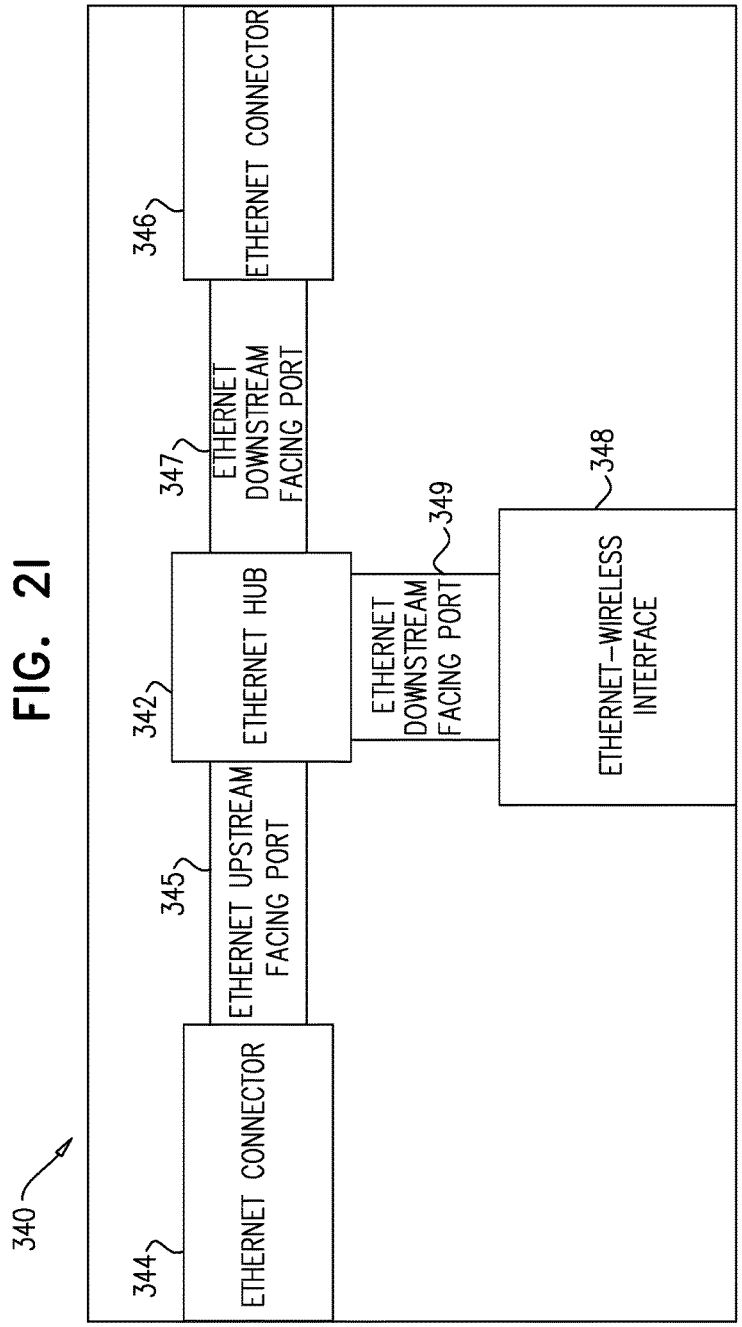

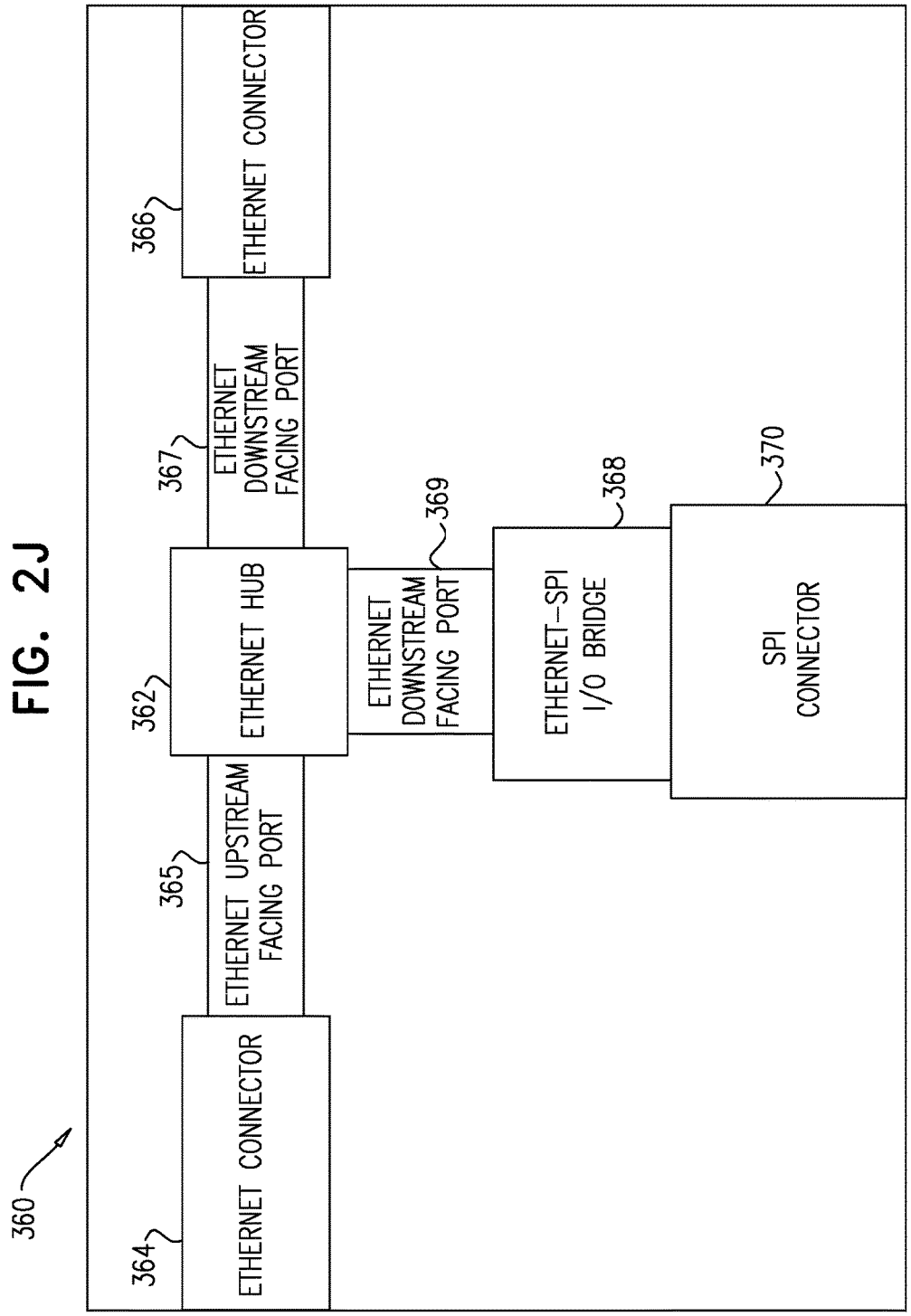

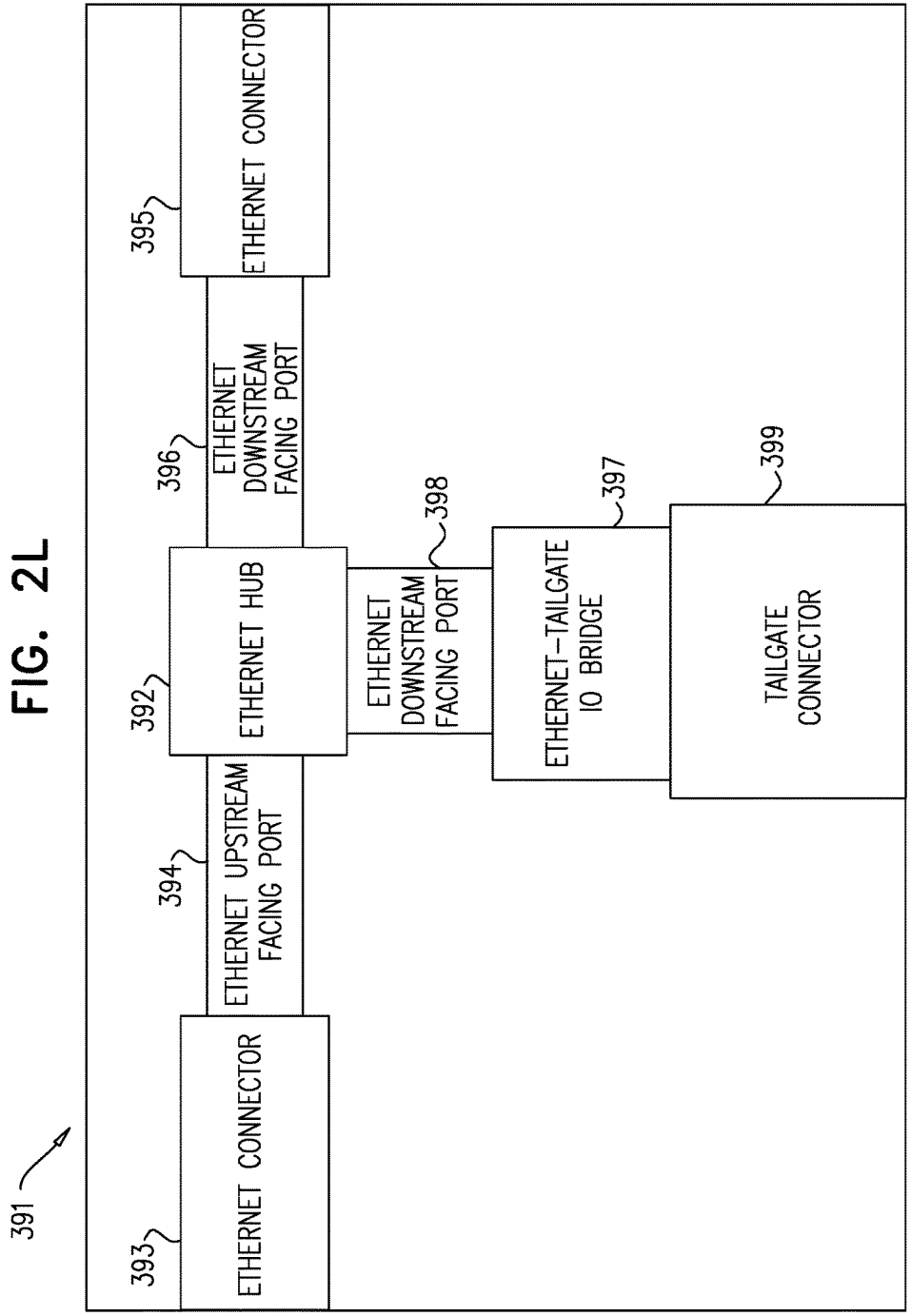

MODULAR INTERCONNECTION SYSTEM AND COMPONENTS THEREFOR

FIELD OF THE INVENTION

The present invention relates generally to point of sale systems and more particularly to interconnections between various elements of point of sale systems.

BACKGROUND OF THE INVENTION

Various types of wired interconnectivity devices are known for interconnecting elements of point of sale systems.

SUMMARY OF THE INVENTION

The present invention seeks to provide improved interconnectivity for various elements of point of sale systems.

There is thus provided in accordance with a preferred embodiment of the present invention a modular interconnectivity assembly for interconnecting elements of a point of sale system, the modular interconnectivity assembly including at least one interconnectivity module including an Input/Output (I/O) hub having at least one upstream facing port and at least two downstream facing ports, at least one upstream connector connected to the at least one upstream facing port of the I/O hub and adapted for communication in accordance with a first communication protocol, at least one downstream connector connected to at least one of the at least two downstream facing ports and adapted for communication in accordance with the first communication protocol and at least one interface connected to another of the at least two downstream facing ports and adapted for communication in accordance with a second communication protocol, different from the first communication protocol.

There is also provided in accordance with another preferred embodiment of the present invention a point of sale system including a point of sale terminal communicating with a first communication protocol, at least one point of sale device other than a point of sale terminal communicating with a second communication protocol, a modular interconnectivity assembly interconnecting the point of sale terminal and the at least one point of sale device, the modular interconnectivity assembly including at least one interconnectivity module including an Input/Output (I/O) hub having at least one upstream facing port and at least two downstream facing ports, at least one upstream connector connected to the at least one upstream facing port I/O hub and adapted for communication in accordance with the first communication protocol, at least one downstream connector connected to at least one of the at least two downstream facing ports and adapted for communication in accordance with the first communication protocol, and at least one interface connected to another of the at least two downstream facing ports and adapted for communication in accordance with the second communication protocol, different from the first communication protocol.

Preferably, the at least one interface includes an I/O bridge circuit. Additionally, the I/O bridge circuit is at least one of a USB-Serial bridge circuit, a USB-Ethernet bridge circuit, an Ethernet-Serial bridge circuit and an Ethernet-USB bridge circuit.

In accordance with a preferred embodiment of the present invention the at least one interface includes a wireless interface circuit.

In accordance with a preferred embodiment of the present invention the at least one interconnectivity module includes at least a first interconnectivity module and a second interconnectivity module which is selectably connected to the first interconnectivity module, the first interconnectivity module including a first module Input/Output (I/O) hub having at least one first module upstream facing port and at least two first module downstream facing ports, at least one first module upstream connector connected to the at least one first module upstream facing port of the first module I/O hub and adapted for communication in accordance with the first communication protocol, at least one first module downstream connector connected to at least one of the at least two first module downstream facing ports and adapted for communication in accordance with the first communication protocol and at least one first module interface including an I/O bridge circuit connected to another of the at least two first module downstream facing ports and adapted for communication in accordance with the second communication protocol, different from the first communication protocol and the second interconnectivity module including a second module Input/Output (I/O) hub having at least one second module upstream facing port and at least two second module downstream facing ports, at least one second module upstream connector connected to the at least one second module upstream facing port of the second module I/O hub and adapted for communication in accordance with the first communication protocol, at least one second module downstream connector connected to at least one of the at least two second module downstream facing ports and adapted for communication in accordance with the first communication protocol and at least one second module interface, not including an I/O bridge circuit, connected to another of the at least two second module downstream facing ports and adapted for communication in accordance with a third communication protocol, different from the first and second communication protocols.

Preferably, the at least one interconnectivity module includes at least a first interconnectivity module and a second interconnectivity module which is selectably connected to the first interconnectivity module, the first interconnectivity module including a first module Input/Output (I/O) hub having at least one first module upstream facing port and at least two first module downstream facing ports, at least one first module upstream connector connected to the at least one first module upstream facing port of the first module I/O hub and adapted for communication in accordance with the first communication protocol, at least one first module downstream connector connected to at least one of the at least two first module downstream facing ports and adapted for communication in accordance with the first communication protocol and at least one first module interface including an I/O bridge circuit connected to another of the at least two first module downstream facing ports and adapted for communication in accordance with the second communication protocol, different from the first communication protocol and the second interconnectivity module including a second module Input/Output (I/O) hub having at least one second module upstream facing port and at least two second module downstream facing ports, at least one second module upstream connector connected to the at least one second module upstream facing port of the second module I/O hub and adapted for communication in accordance with the first communication protocol, at least one second module downstream connector connected to at least one of the at least two second module downstream facing ports and adapted for communication in accordance with the first communication protocol; and at least one wireless interface connected to another of the at least two second module downstream facing ports.

In accordance with a preferred embodiment of the present invention the at least one interconnectivity module includes at least a first interconnectivity module and a second interconnectivity module which is selectably connected to the first interconnectivity module, the first interconnectivity module including a first module Input/Output (I/O) hub having at least one first module upstream facing port and at least two first module downstream facing ports, at least one first module upstream connector connected to the at least one first module upstream facing port of the first module I/O hub and adapted for communication in accordance with the first communication protocol, at least one first module downstream connector connected to at least one of the at least two first module downstream facing ports and adapted for communication in accordance with the first communication protocol and at least one first module interface including a first type of I/O bridge circuit connected to another of the at least two first module downstream facing ports and adapted for communication in accordance with the second communication protocol, different from the first communication protocol and the second interconnectivity module including a second module Input/Output (I/O) hub having at least one second module upstream facing port and at least two second module downstream facing ports, at least one second module upstream connector connected to the at least one second module upstream facing port of the second module I/O hub and adapted for communication in accordance with the first communication protocol, at least one second module downstream connector connected to at least one of the at least two second module downstream facing ports and adapted for communication in accordance with the first communication protocol and at least one second module interface, including a second type of I/O bridge circuit, different from the first type of I/O bridge circuit, and connected to another of the at least two second module downstream facing ports and adapted for communication in accordance with a third communication protocol, different from the first and second communication protocols.

In accordance with a preferred embodiment of the present invention the at least one interconnectivity module includes at least a first interconnectivity module and a second interconnectivity module which is selectably connected to the first interconnectivity module, the first interconnectivity module including a first module Input/Output (I/O) hub having at least one first module upstream facing port and at least two first module downstream facing ports, at least one first module upstream connector connected to the at least one first module upstream facing port of the first module I/O hub and adapted for communication in accordance with the first communication protocol, at least one first module downstream connector connected to at least one of the at least two first module downstream facing ports and adapted for communication in accordance with the first communication protocol and at least one first module interface including a first type of I/O bridge circuit connected to another of the at least two first module downstream facing ports and adapted for communication in accordance with the second communication protocol, different from the first communication protocol and the second interconnectivity module including a second module Input/Output (I/O) hub having at least one second module upstream facing port and at least two second module downstream facing ports, at least one second module upstream connector connected to the at least one second module upstream facing port of the second module I/O hub and adapted for communication in accordance with the second communication protocol, at least one second module downstream connector connected to at least one of the at least two second module downstream facing ports and adapted for communication in accordance with the second communication protocol and at least one second module interface, including a second type of I/O bridge circuit, different from the first type of I/O bridge circuit, and connected to another of the at least two second module downstream facing ports and adapted for communication in accordance with a third communication protocol, different from the first and second communication protocols.

Preferably, the first communication protocol is one of a USB communication protocol and an Ethernet communication protocol. Additionally, the second communication protocol is one of a serial communication protocol, a USB communication protocol, an Ethernet communication protocol, a Tailgate communication protocol, an SPI communication protocol, an I2C communication protocol, a WiFi communication protocol and a Bluetooth communication protocol.

BRIEF DESCRIPTION OF PREFERRED EMBODIMENTS

The present invention will be understood and appreciated more fully from the following detailed description, taken in conjunction with the drawings in which:

FIGS. 2A, 2B, 2C, 2D, 2E, 2F, 2G, 2H, 2I, 2J, 2K and 2L are simplified illustrations of specific examples of point of sale system connection modules operative in accordance with a preferred embodiment of the present invention;

Figure 1:
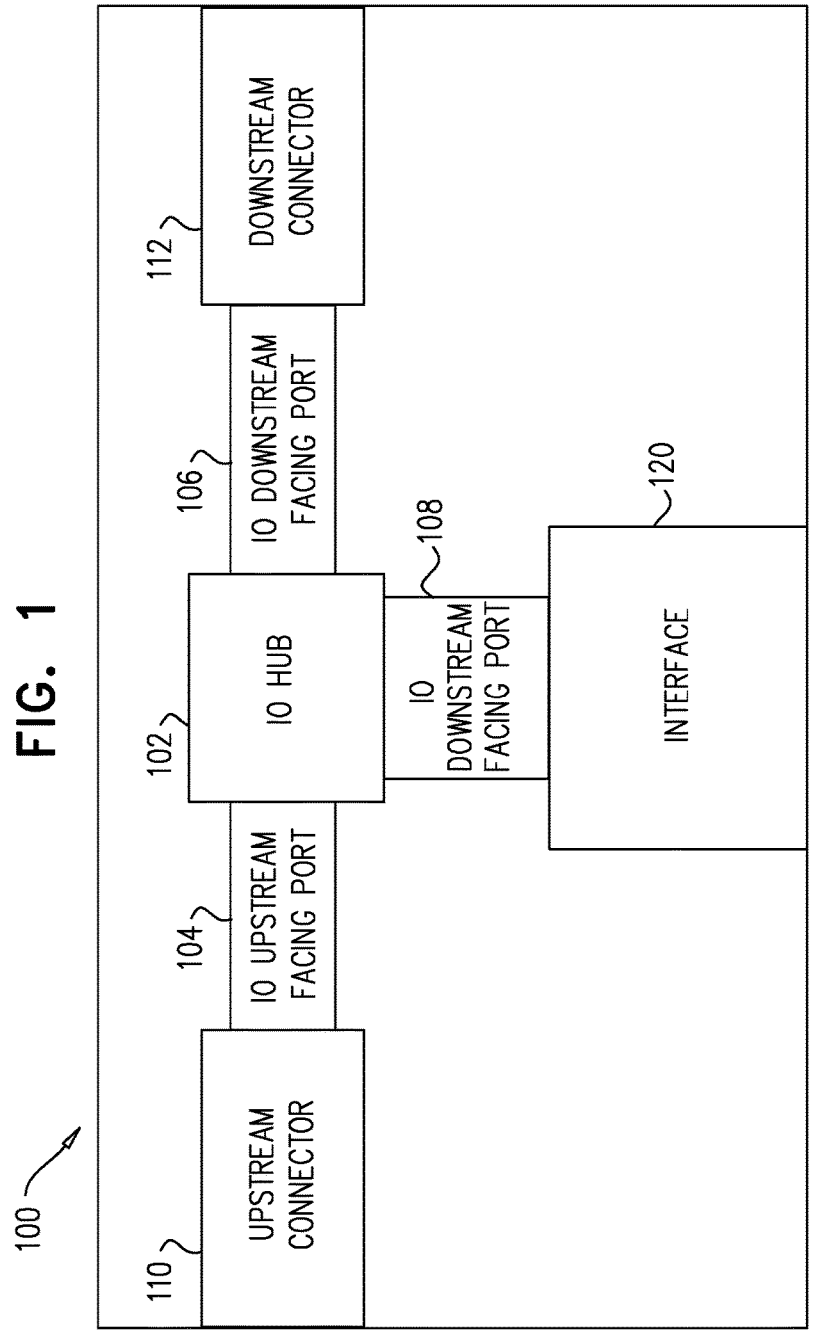
FIG. 1 is a simplified illustration of a point of sale system connection module constructed and operative in accordance with a preferred embodiment of the present invention.
Figure 2A:
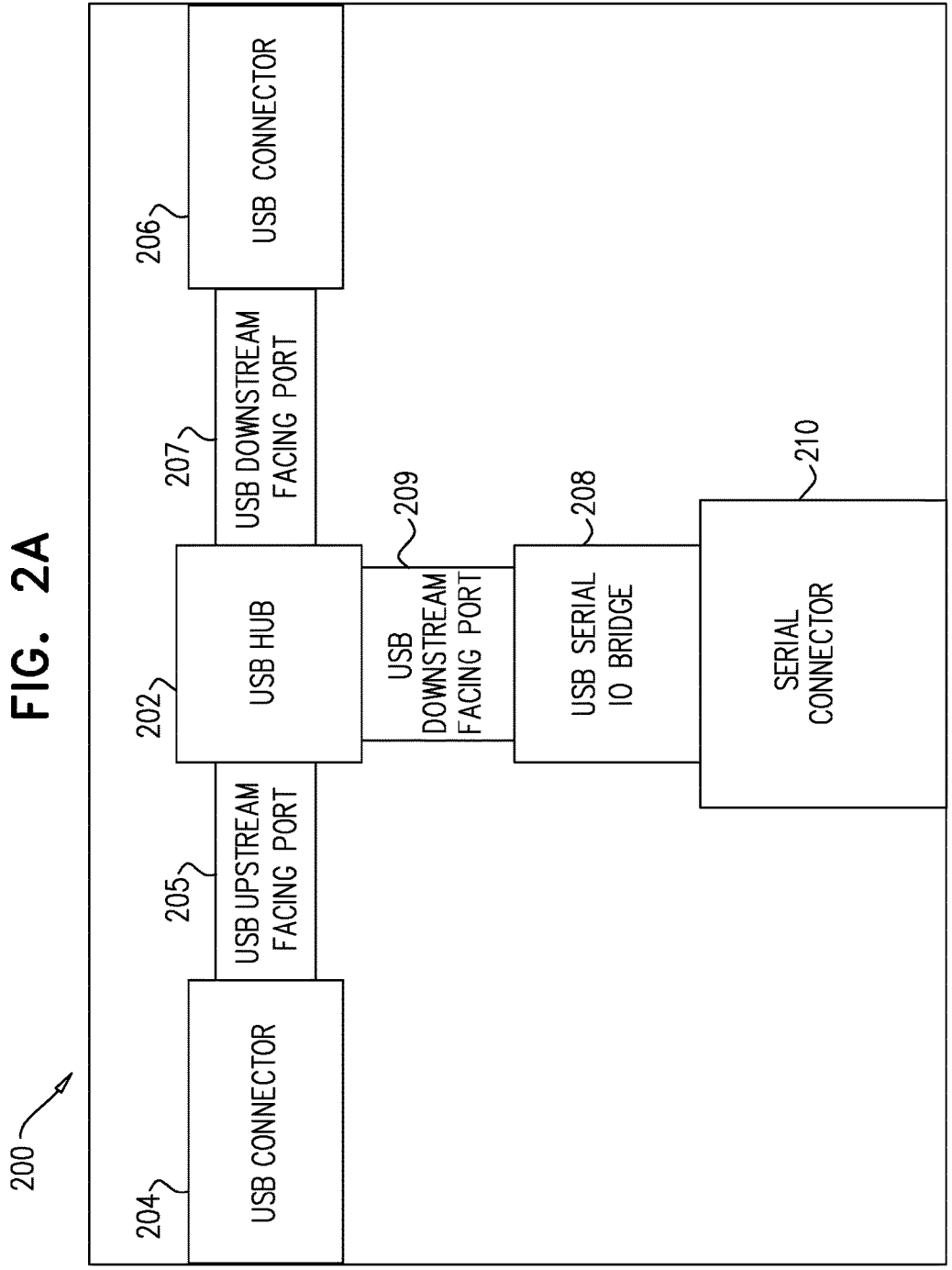
Figure 2E:
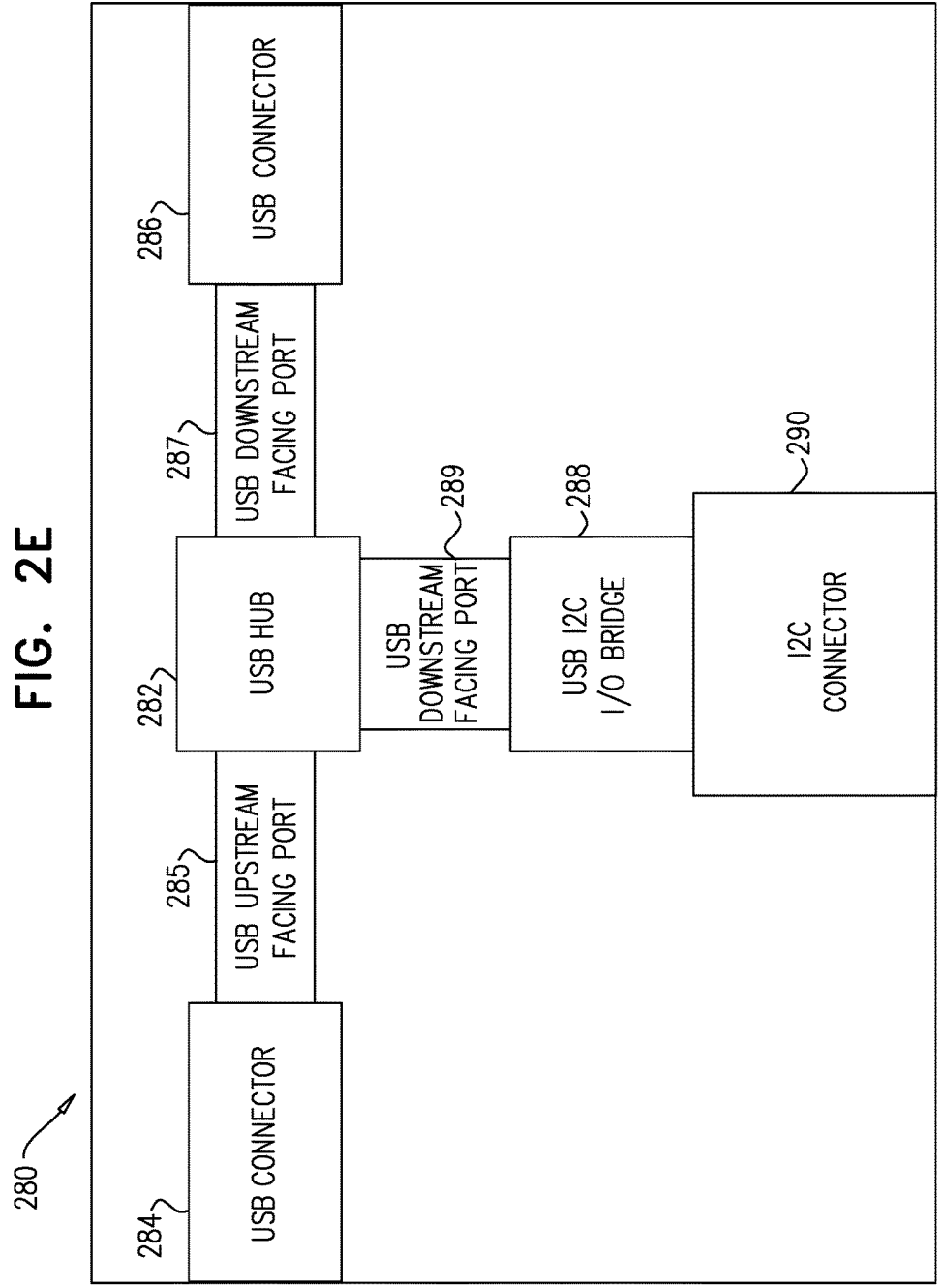
Figure 2F:
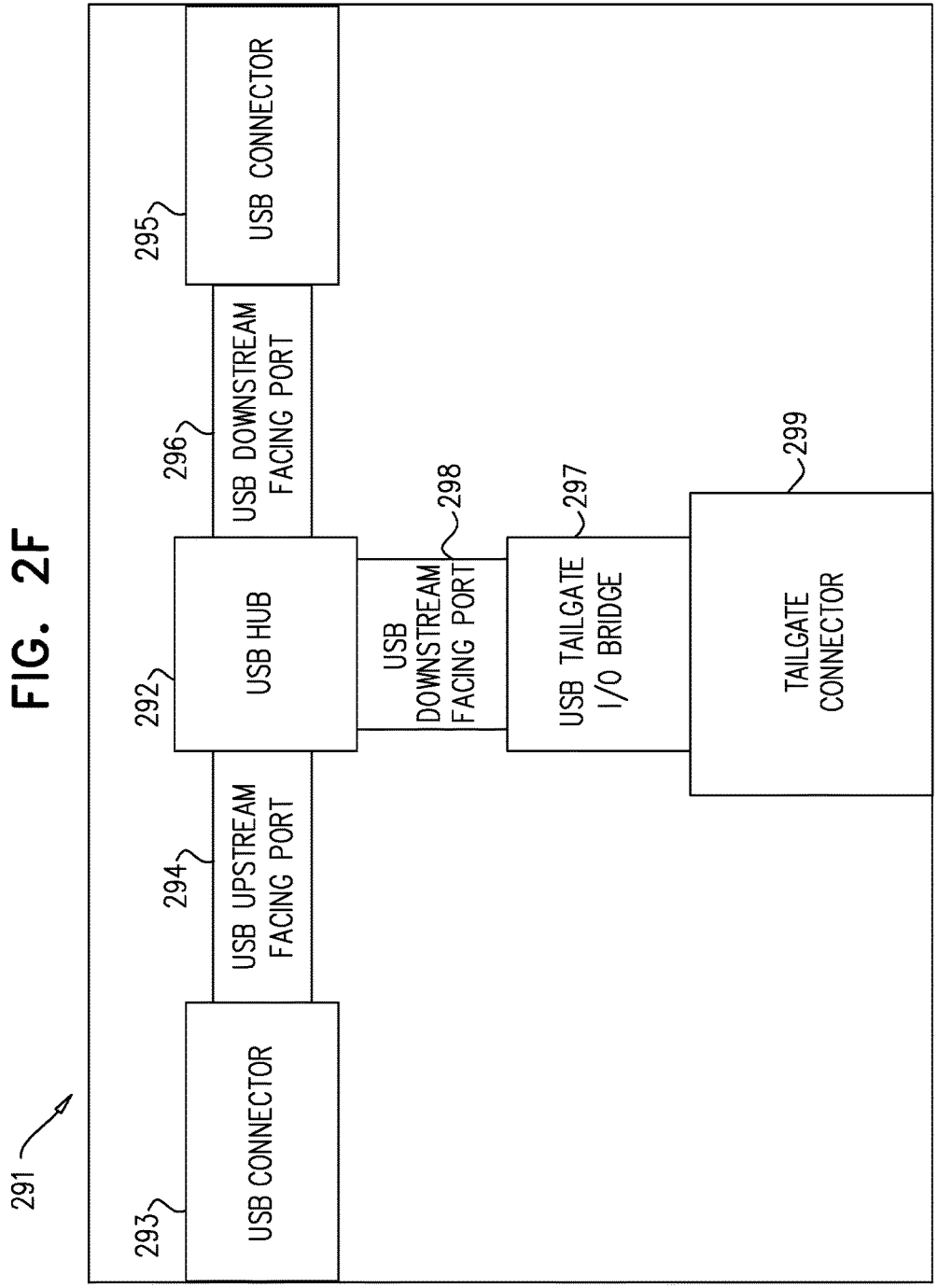
Figure 2K:
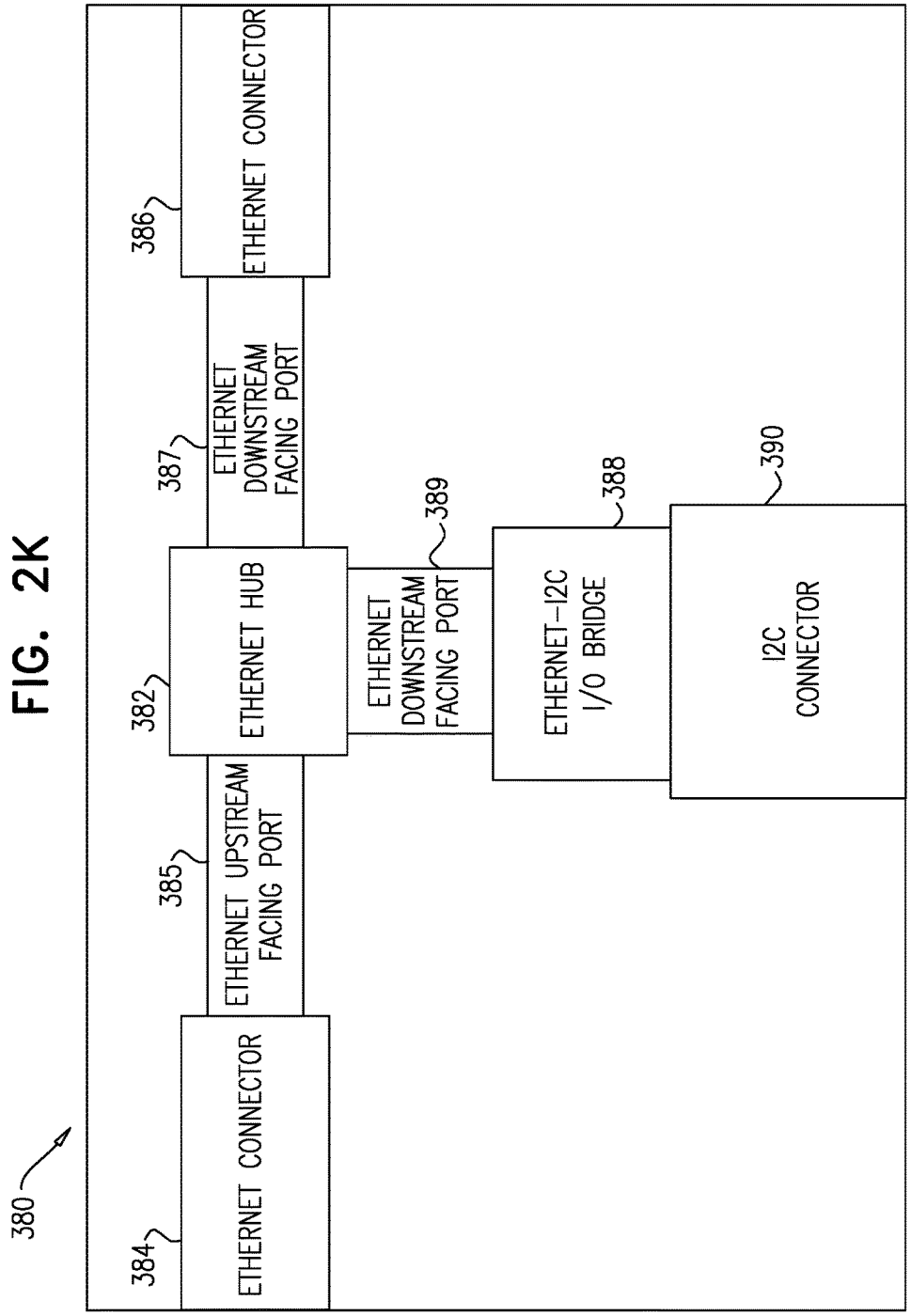
Figure 3:
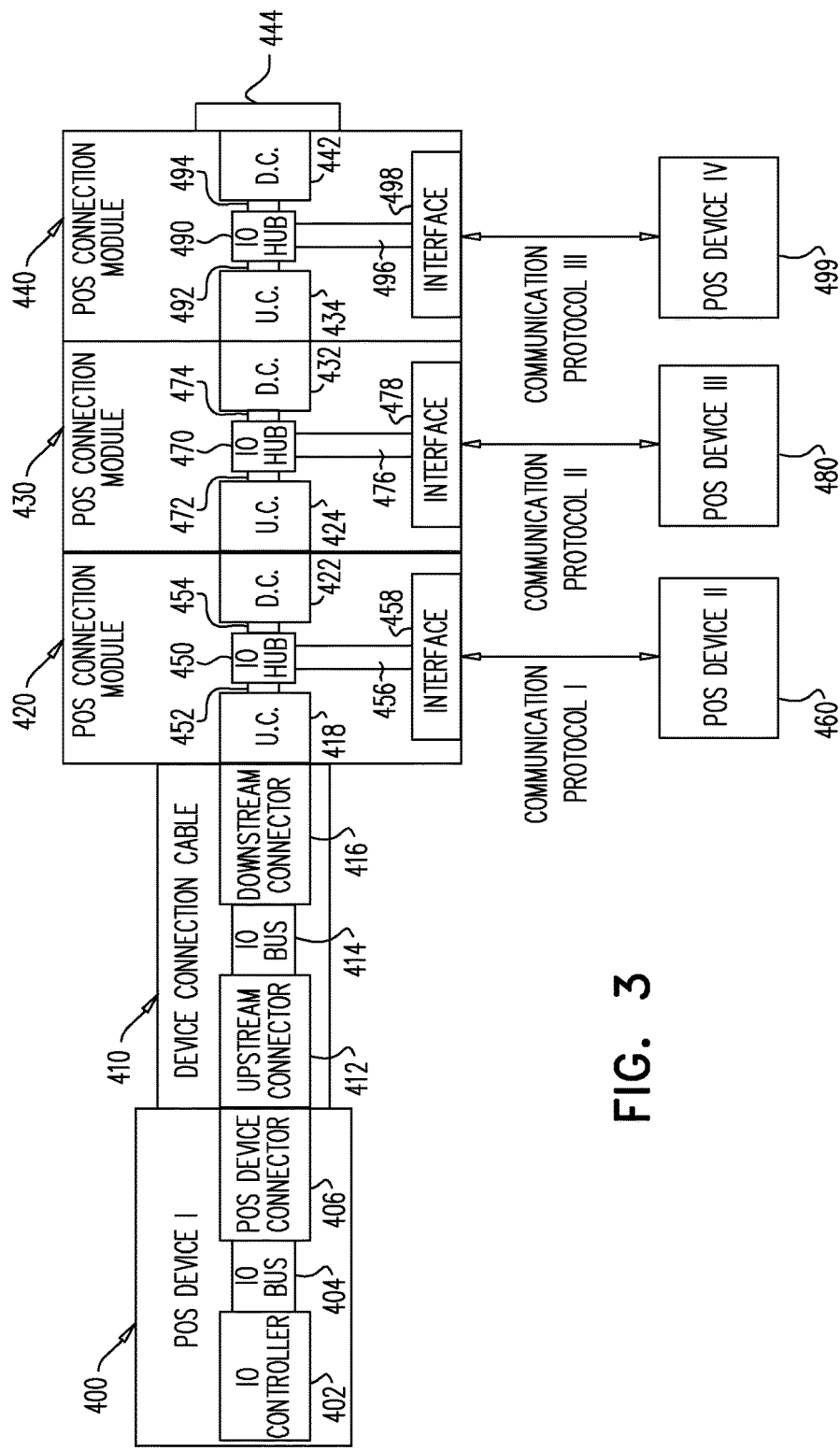
Figure 4A:
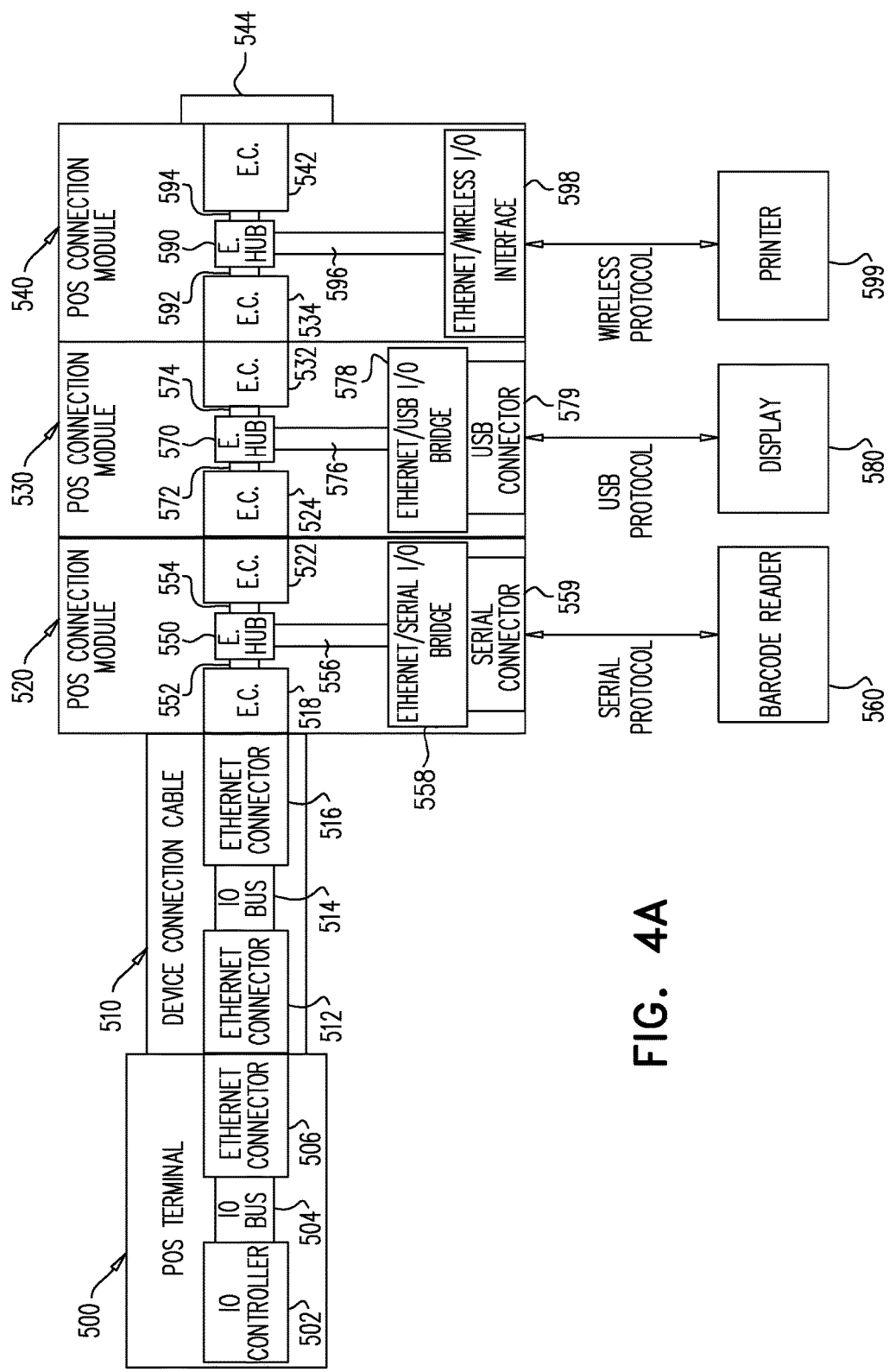
Figure 4B:
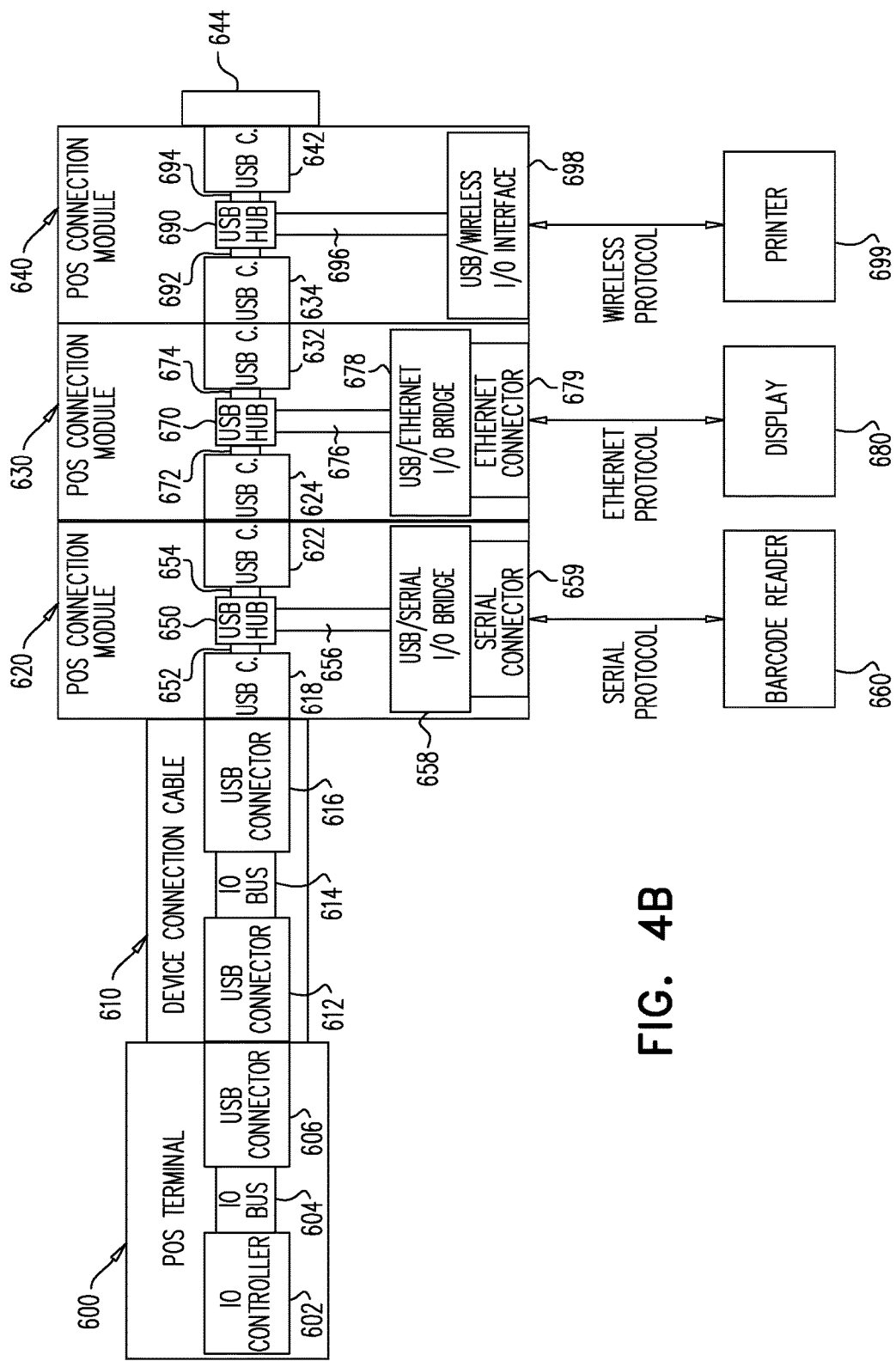
Figure 4C:
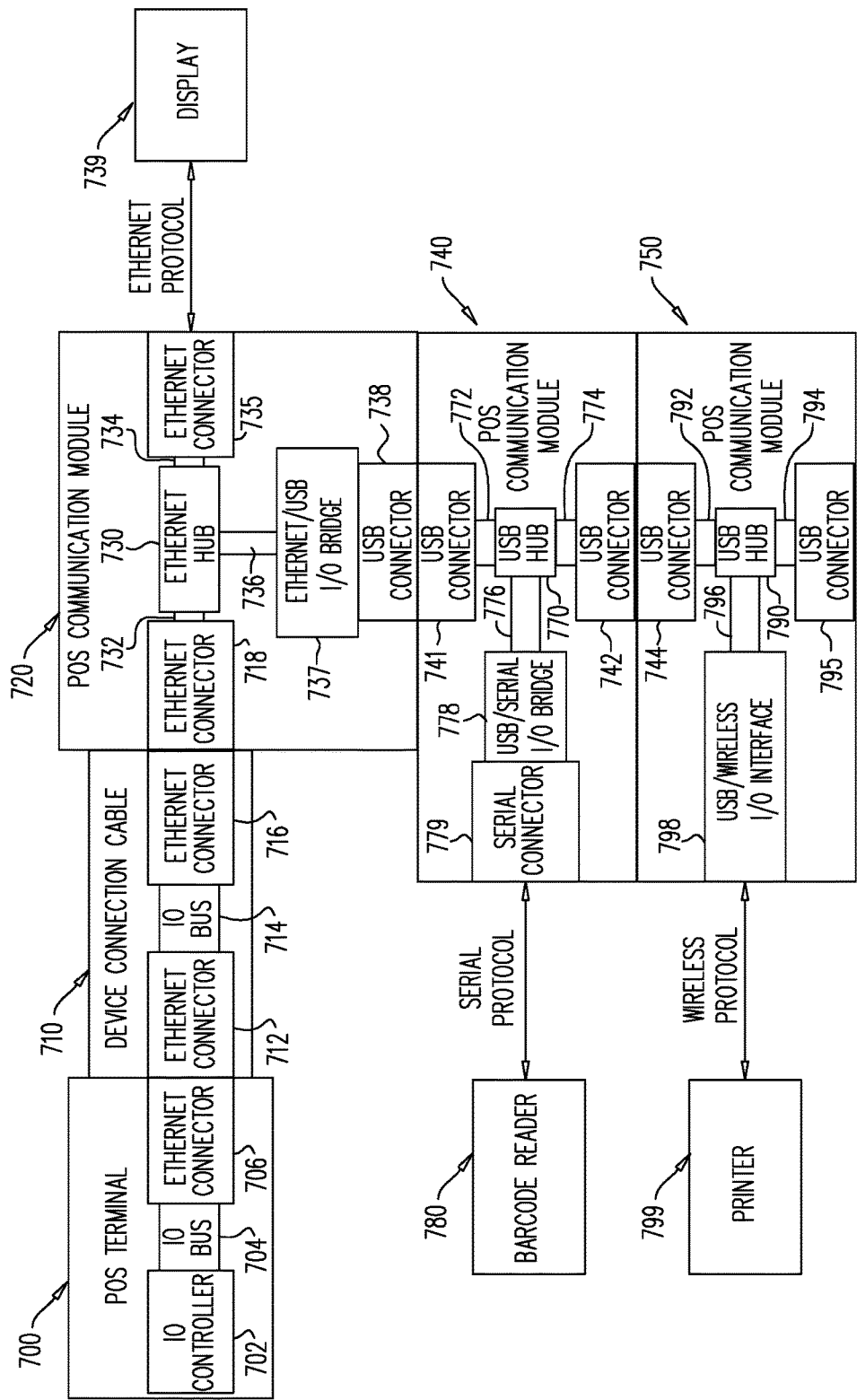

FIG. 3 is a simplified illustration of a point of sale interconnection arrangement employing modules of the type shown in FIGS. 1-2L constructed and operative in accordance with a preferred embodiment of the present invention; and FIGS. 4A, 4B and 4C are simplified illustrations of specific examples of point of sale interconnection arrangements employing various embodiments of the modular interconnectivity assembly employing different combinations of connection modules of the types shown in FIGS. 2A-2L.

DETAILED DESCRIPTION OF PREFERRED EMBODIMENTS

Reference is now made to FIG. 1, which is a simplified illustration of a point of sale (POS) system connection module 100 constructed and operative in accordance with a preferred embodiment of the present invention. For the purposes of the present application, a point of sale system is any system that is used for a payment transaction and which includes at least two POS devices, such as any of a cash register, a point of sale terminal, a payment terminal, a PINpad, a payment card reader, a printer, a display, a bar code reader and a wireless payment device reader.

As seen in FIG. 1, the point of sale connection module 100 includes an Input/Output (I/O) hub 102 having at least one upstream facing port 104 and at least two downstream facing ports, here two downstream ports respectively designated by reference numerals 106 and 108. Hub 102 may be any suitable I/O hub. Examples of possibly suitable I/O hubs include USB hubs and Ethernet hubs. The point of sale connection module 100 preferably includes at least one upstream connector, here shown as a single upstream connector designated by reference numeral 110, connected to the upstream facing port 104 of (I/O) hub 102 and adapted for communication in accordance with a first communication protocol. The first communication protocol may be any suitable communication protocol. Examples are USB and Ethernet protocols.

At least one downstream connector, here shown as a single downstream connector 112 is connected to one of the at least two downstream facing ports, here downstream port 106, and is adapted for communication in accordance with the first communication protocol. At least one interface, here a single interface 120, is connected to another of the at least two downstream facing ports, here port 108, and is adapted for interfacing between communication in accordance with the first communication protocol and communications with a second communication protocol, different from the first communication protocol. The second communication protocol may be any suitable communication protocol other than the first communication protocol. Examples are USB, Ethernet, Tailgate, SPI, I2C, WiFi and Bluetooth protocols.

Interface 120 may be any suitable interface, such as, for example, a USB-Serial IO Bridge, a USB-Ethernet IO Bridge, a USB-Wireless Interface, a USB-Tailgate Interface, a USB-SPI Interface, a USB-I2C Interface, an Ethernet-Serial IO Bridge, an Ethernet-USB IO Bridge, an Ethernet-Wireless Interface, an Ethernet-Tailgate Interface, an Ethernet-SPI Interface and an Ethernet-I2C Interface.

It is appreciated that multiple modules of the same or different types may be interconnected via their respective upstream and downstream connectors to provide suitably configured interconnectivity between a multiplicity of point of sale devices using different communication protocols, thus obviating the need to provide a universal interconnectivity cable suitable for many different communication protocols and having a multiplicity of conductors and a multiplicity of connectors, most of which are not used and are exposed in any given connection configuration.

Reference is now made to FIGS. 2A-2L, which are simplified illustrations of specific examples of point of sale system connection modules operative in accordance with a preferred embodiment of the present invention.

FIG. 2A illustrates an implementation of a module 200 in which Input/Output (I/O) hub 102 (FIG. 1) is a USB hub, here designated by reference numeral 202; upstream connector 110 (FIG. 1) is a USB connector, here designated by reference numeral 204, connected to an upstream-facing port 205 of hub 202; downstream connector 112 (FIG. 1) is a USB connector, here designated by reference numeral 206, connected to a downstream-facing port 207 of hub 202 and interface 120 (FIG. 1) is a USB-Serial I/O Bridge, here designated by reference numeral 208, connected to a downstream-facing port 209 of hub 202. A serial connector 210 is connected to USB-Serial I/O Bridge 208. Here the first communication protocol is USB and the second communication protocol is Serial.

FIG. 2B illustrates an implementation of a module 220 in which Input/Output (I/O) hub 102 (FIG. 1) is a USB hub, here designated by reference numeral 222; upstream connector 110 (FIG. 1) is a USB connector, here designated by reference numeral 224, connected to an upstream-facing port 225 of hub 222; downstream connector 112 (FIG. 1), is a USB connector, here designated by reference numeral 226, connected to a downstream-facing port 227 of USB huh 222 and interface 120 (FIG. 1) is a USB-Ethernet I/O Bridge, here designated by reference numeral 228, connected to a downstream-facing port 229 of USB hub 222. An Ethernet connector 230 is connected to USB-Ethernet I/O Bridge 228. Here the first communication protocol is USB and the second communication protocol is Ethernet.

FIG. 2C illustrates an implementation of a module 240 in which Input/Output (I/O) hub 102 (FIG. 1) is a USB hub, here designated by reference numeral 242; upstream connector 110 (FIG. 1) is a USB connector, here designated by reference numeral 244, connected to an upstream-facing port 245 of USB hub 242; downstream connector 112 (FIG. 1), is a USB connector, here designated by reference numeral 246, connected to a downstream-facing port 247 of USB hub 242 and interface 120 (FIG. 1) is a USB-Wireless Interface, here designated by reference numeral 248, connected to a downstream-facing port 249 of USB hub 242. Here the first communication protocol is USB and the second communication protocol is a wireless communication protocol.

FIG. 2D illustrates an implementation of a module 260 in which Input/Output (I/O) hub 102 (FIG. 1) is a USB huh, here designated by reference numeral 262; upstream connector 110 (FIG. 1) is a USB connector, here designated by reference numeral 264, connected to an upstream-facing port 265 of USB hub 262; downstream connector 112 (FIG. 1), is a USB connector, here designated by reference numeral 266, connected to a downstream-facing port 267 of USB hub 262 and interface 120 (FIG. 1) is a USB-SPI IO Bridge, here designated by reference numeral 268, connected to a downstream-facing port 269 of USB huh 262. An SPI connector 270 is connected to USB-SPI I/O Bridge 268. Here the first communication protocol is USB and the second communication protocol is an SPI communication protocol.

FIG. 2E illustrates an implementation of a module 280 in which Input/Output (I/O) hub 102 (FIG. 1) is a USB hub, here designated by reference numeral 282; upstream connector 110 (FIG. 1) is a USB connector, here designated by reference numeral 284, connected to an upstream-facing port 285 of USB hub 282; downstream connector 112 (FIG. 1), is a USB connector, here designated by reference numeral 286, connected to a downstream-facing port 287 of USB hub 282 and interface 120 (FIG. 1) is a USB-I2C IO Bridge, here designated by reference numeral 288, connected to a downstream-facing port 289 of USB hub 282. An I2C connector 290 is connected to USB-SPI I/O Bridge 288. Here the first communication protocol is USB and the second communication protocol is an I2C communication protocol.

FIG. 2F illustrates an implementation of a module 291 in which Input/Output (I/O) hub 102 (FIG. 1) is a USB hub, here designated by reference numeral 292; upstream connector 110 (FIG. 1) is a USB connector, here designated by reference numeral 293, connected to an upstream-facing port 294 of USB hub 292; downstream connector 112 (FIG. 1), is a USB connector, here designated by reference numeral 295, connected to a downstream-facing port 296 of USB hub 292 and interface 120 (FIG. 1) is a USB-Tailgate IO Bridge, here designated by reference numeral 297, connected to a downstream-facing port 298 of USB hub 292. A Tailgate connector 299 is connected to USB-Tailgate I/O Bridge 297. Here the first communication protocol is USB and the second communication protocol is a Tailgate communication protocol.

FIG. 2G illustrates an implementation of a module 300 in which Input/Output (I/O) hub 102 (FIG. 1) is a Ethernet hub, here designated by reference numeral 302; upstream connector 110 (FIG. 1) is a Ethernet connector, here designated by reference numeral 304, connected to an upstream-facing port 305 of hub 302; downstream connector 112 (FIG. 1) is a Ethernet connector, here designated by reference numeral 306, connected to a downstream-facing port 307 of hub 302 and interface 120 (FIG. 1) is a Ethernet-Serial I/O Bridge, here designated by reference numeral 308, connected to a downstream-facing port 309 of hub 302. A serial connector 310 is connected to Ethernet-Serial I/O Bridge 308. Here the first communication protocol is Ethernet and the second communication protocol is Serial.

FIG. 2H illustrates an implementation of a module 320 in which Input/Output (I/O) hub 102 (FIG. 1) is a Ethernet hub, here designated by reference numeral 322; upstream connector 110 (FIG. 1) is a Ethernet connector, here designated by reference numeral 324, connected to an upstream-facing port 325 of hub 322; downstream connector 112 (FIG. 1) is a Ethernet connector, here designated by reference numeral 326, connected to a downstream-facing port 327 of hub 322 and interface 120 (FIG. 1) is a Ethernet-USB I/O Bridge, here designated by reference numeral 328, connected to a downstream-facing port 329 of hub 322. A USB connector 330 is connected to Ethernet-USB I/O Bridge 328. Here the first communication protocol is Ethernet and the second communication protocol is USB.

FIG. 2I illustrates an implementation of a module 340 in which Input/Output (I/O) hub 102 (FIG. 1) is a Ethernet hub, here designated by reference numeral 342; upstream connector 110 (FIG. 1) is a Ethernet connector, here designated by reference numeral 344, connected to an upstream-facing port 345 of Ethernet hub 342; downstream connector 112 (FIG. 1), is a Ethernet connector, here designated by reference numeral 346, connected to a downstream-facing port 347 of Ethernet hub 342 and interface 120 (FIG. 1) is a Ethernet-Wireless Interface, here designated by reference numeral 348, connected to a downstream-facing port 349 of Ethernet hub 342. Here the first communication protocol is Ethernet and the second communication protocol is a wireless communication protocol.

FIG. 2J illustrates an implementation of a module 360 in which Input/Output (I/O) hub 102 (FIG. 1) is a Ethernet hub, here designated by reference numeral 362; upstream connector 110 (FIG. 1) is a Ethernet connector, here designated by reference numeral 364, connected to an upstream-facing port 365 of Ethernet hub 362; downstream connector 112 (FIG. 1), is a Ethernet connector, here designated by reference numeral 366, connected to a downstream-facing port 367 of Ethernet hub 362 and interface 120 (FIG. 1) is a Ethernet-SPI IO Bridge, here designated by reference numeral 368, connected to a downstream-facing port 369 of Ethernet hub 362. An SPI connector 370 is connected to Ethernet-SPI I/O Bridge 368. Here the first communication protocol is Ethernet and the second communication protocol is an SPI communication protocol.

FIG. 2K illustrates an implementation of a module 380 in which Input/Output (I/O) hub 102 (FIG. 1) is a Ethernet hub, here designated by reference numeral 382; upstream connector 110 (FIG. 1) is a Ethernet connector, here designated by reference numeral 384, connected to an upstream-facing port 385 of Ethernet hub 382; downstream connector 112 (FIG. 1), is a Ethernet connector, here designated by reference numeral 386, connected to a downstream-facing port 387 of Ethernet hub 382 and interface 120 (FIG. 1) is a Ethernet-I2C IO Bridge, here designated by reference numeral 388, connected to a downstream-facing port 389 of Ethernet hub 382. An I2C connector 390 is connected to Ethernet-I2C I/O Bridge 388. Here the first communication protocol is Ethernet and the second communication protocol is an I2C communication protocol.

FIG. 2L illustrates an implementation of a module 391 in which Input/Output (I/O) hub 102 (FIG. 1) is a Ethernet hub, here designated by reference numeral 392; upstream connector 110 (FIG. 1) is a Ethernet connector, here designated by reference numeral 393, connected to an upstream-facing port 394 of Ethernet hub 392 downstream connector 112 (FIG. 1), is a Ethernet connector, here designated by reference numeral 395, connected to a downstream-facing port 396 of Ethernet hub 392 and interface 120 (FIG. 1) is a Ethernet-Tailgate IO Bridge, here designated by reference numeral 397, connected to a downstream-facing port 398 of Ethernet hub 392. A Tailgate connector 399 is connected to Ethernet-Tailgate I/O Bridge 397. Here the first communication protocol is Ethernet and the second communication protocol is a Tailgate communication protocol.

Reference is now made to FIG. 3, which is a simplified illustration of a point of sale interconnection arrangement employing modules of the type shown in FIGS. 1-2L, constructed and operative in accordance with a preferred embodiment of the present invention.

As seen in FIG. 3, a point of sale (POS) device 400, such as any of a cash register, a point of sale terminal, a payment terminal, a PINpad, a payment card reader, a printer, a display, a bar code reader and a wireless payment device reader, preferably including an IO controller 402, an IO bus 404 and a POS device connector 406 is physically coupled to a device connection cable 410, preferably including an upstream connector 412, an IO bus 414 and a downstream connector 416. The device connection cable 410 is preferably physically coupled via its downstream connector 416 to an upstream connector 418 of a first point of sale connection module 420, which is preferably a point of sale connection module 100 (FIG. 1) of the type described hereinabove, examples of which are described hereinabove with reference to FIGS. 2A-2L.

A downstream connector 422 of first point of sale connection module 420 is physically coupled to an upstream connector 424 of a second point of sale connection module 430, which is also preferably a point of sale connection module 100 (FIG. 1) of the type described hereinabove, examples of which are described hereinabove with reference to FIGS. 2A-2L, and may be identical to or different from the first point of sale connection module 420.

A downstream connector 432 of second point of sale connection module 430 is physically coupled to an upstream connector 434 of a third point of sale connection module 440, which is also preferably a point of sale connection module 100 (FIG. 1) of the type described hereinabove, examples of which are described hereinabove with reference to FIGS. 2A-2L, and may be identical to or different from the first point of sale connection module 420 and the second point of sale connection module 430. Preferably, a downstream connector 442 of the third point of sale connection module 440 is covered by a cover element 444, preventing unauthorized access thereto. Alternatively, third point of sale connection module 440 may be formed without a downstream connector 442. It is also appreciated that more than three point of sale connection modules may be physically interconnected in this manner or any other suitable manner.

An I/O hub 450 of first point of sale connection module 420 is preferably connected via an upstream facing port 452 to upstream connector 418 and via a downstream facing port 454 to downstream connector 422. Hub 450 is also preferably connected via a downstream facing port 456 to an interface 458 which communicates with a POS device 460 via a first communication protocol. Hub 450 may be any suitable I/O hub. Examples of possibly suitable I/O hubs include USB hubs and Ethernet hubs. Upstream connector 418 and downstream connector 422 may be any suitable connectors. Examples of possibly suitable connectors include USB connectors, Ethernet connectors, serial connectors and parallel connectors. Interface 458 may be any suitable interface, such as, for example, a USB-Serial IO Bridge, a USB-Ethernet IO Bridge, a USB-Wireless Interface, a USB-Tailgate Interface, a USB-SPI Interface, a USB-I2C Interface, an Ethernet-Serial IO Bridge, an Ethernet-USB IO Bridge, an Ethernet-Wireless Interface, an Ethernet-Tailgate Interface, an Ethernet-SPI Interface and an Ethernet-I2C Interface. POS device 460 may be any suitable POS device, such as any of a cash register, a point of sale terminal, a payment terminal, a PINpad, a payment card reader, a printer, a display, a bar code reader and a wireless payment device reader. The first communication protocol may be any suitable communication protocol. Examples are USB, Ethernet, Tailgate, SPI, I2C, WiFi and Bluetooth.

An I/O hub 470 of second point of sale connection module 430 is preferably connected via an upstream facing port 472 to upstream connector 424 and via a downstream facing port 474 to downstream connector 432. Hub 470 is also preferably connected via a downstream facing port 476 to an interface 478 which communicates with a POS device 480 via a second communication protocol. Hub 470 may be any suitable I/O hub. Examples of possibly suitable I/O hubs include USB hubs and Ethernet hubs. Upstream connector 424 and downstream connector 432 may be any suitable connectors. Examples of possibly suitable connectors include USB connectors, Ethernet connectors, serial connectors and parallel connectors. Interface 478 may be any suitable interface, such as, for example, a USB-Serial IO Bridge, a USB-Ethernet IO Bridge, a USB-Wireless Interface, a USB-Tailgate Interface, a USB-SPI Interface, a USB-I2C interface, an Ethernet-Serial IO Bridge, an Ethernet-USB IO Bridge, an Ethernet-Wireless Interface, an Ethernet-Tailgate Interface, an Ethernet-SPI Interface and an Ethernet-I2C Interface. POS device 480 may be any suitable POS device, such as any of a cash register, a point of sale terminal, a payment terminal, a PINpad, a payment card reader, a printer, a display, a bar code reader and a wireless payment device reader. The second communication protocol may be any suitable communication protocol. Examples are USB, Ethernet, Tailgate, SPI, I2C, WiFi and Bluetooth. The second communication protocol is preferably different from the first communication protocol.

An I/O hub 490 of third point of sale connection module 440 is preferably connected via an upstream facing port 492 to upstream connector 434 and via a downstream facing port 494 to downstream connector 442. Hub 490 is also preferably connected via a downstream facing port 496 to an interface 498 which communicates with a POS device 499 via a third communication protocol. Hub 490 may be any suitable I/O hub. Examples of possibly suitable I/O hubs include USB hubs and Ethernet hubs. Upstream connector 434 and downstream connector 442 may be any suitable connectors. Examples of possibly suitable connectors include USB connectors, Ethernet connectors, serial connectors and parallel connectors. Interface 498 may be any suitable interface, such as, for example, a USB-Serial IO Bridge, a USB-Ethernet IO Bridge, a USB-Wireless Interface, a USB-Tailgate Interface, a USB-SPI Interface, a USB-I2C Interface, an Ethernet-Serial IO Bridge, an Ethernet-USB IO Bridge, an Ethernet-Wireless interface, an Ethernet-Tailgate Interface, an Ethernet-SPI Interface and an Ethernet-I2C Interface. POS device 499 may be any suitable POS device, such as any of a cash register, a point of sale terminal, a payment terminal, a PINpad, a payment card reader, a printer, a display, a bar code reader and a wireless payment device reader. The third communication protocol may be any suitable communication protocol. Examples are USB, Ethernet, Tailgate, SPI, I2C, WiFi and Bluetooth. The third communication protocol is preferably different from at least one of the first and second communication protocols and may be different from both.

It is appreciated that embodiments of the present invention preferably support communication with POS devices using more than one different communication protocols but may also support communication with multiple POS devices using the same communication protocol.

Reference is now made to FIGS. 4A, 4B and 4C, which are simplified illustrations of specific examples of interconnections employing various embodiments of the modular interconnectivity assembly employing different combinations of connection modules of the types shown in FIGS. 2A-2L.

Referring initially to FIG. 4A, it is seen that a point of sale (POS) device 500, such as a Point of Sale (POS) Terminal including an IO controller 502, which is coupled via an IO bus 504 to an Ethernet connector 506, is physically coupled to a device connection cable 510, preferably including an upstream Ethernet connector 512, an Ethernet bus 514 and a downstream Ethernet connector 516. The device connection cable 510 is preferably physically coupled via its downstream Ethernet connector 516 to an upstream Ethernet connector 518 of a first point of sale connection module 520, which is preferably a point of sale connection module 100 (FIG. 1) of the type described hereinabove with reference to FIG. 2A.

A downstream Ethernet connector 522 of first point of sale connection module 520 is physically coupled to an upstream Ethernet connector 524 of a second point of sale connection module 530, which is also preferably a point of sale connection module 100 (FIG. 1) of the general type described hereinabove and is seen to be different from the first point of sale connection module 520.

A downstream Ethernet connector 532 of second point of sale connection module 530 is physically coupled to an upstream Ethernet connector 534 of a third point of sale connection module 540, which is also preferably a point of sale connection module 100 (FIG. 1) of the type described hereinabove and is seen to be different from the first point of sale connection module 520 and from second point of sale connection module 530. Preferably, an Ethernet downstream connector 542 of the third point of sale connection module 540 is covered by a cover element 544, preventing unauthorized access thereto. Alternatively, third point of sale connection module 540 may be formed without a downstream connector 544. It is also appreciated that more than three point of sale connection modules may be physically interconnected in this manner or any other suitable manner.

An Ethernet hub 550 of first point of sale connection module 520 is preferably connected via an upstream facing port 552 to upstream Ethernet connector 518 and via a downstream facing port 554 to downstream Ethernet connector 522. Hub 550 is also preferably connected via a downstream facing port 556 to an Ethernet/Serial I/O bridge interface 558 which communicates via a serial connector 559 with a Barcode Reader POS device 560 using a Serial communication protocol.

An Ethernet hub 570 of second point of sale connection module 530 is preferably connected via an upstream facing port 572 to upstream Ethernet connector 524 and via a downstream facing port 574 to downstream Ethernet connector 532. Hub 570 is also preferably connected via a downstream facing port 576 to an Ethernet/USB I/O bridge interface 578 which communicates via a USB connector 579 with a Display POS device 580 using a USB communication protocol.

An Ethernet hub 590 of third point of sale connection module 540 is preferably connected via an upstream facing port 592 to upstream Ethernet connector 534 and via a downstream facing port 594 to downstream Ethernet connector 542. Hub 590 is also preferably connected via a downstream facing port 596 to an Ethernet/Wireless I/O interface 598 which communicates wirelessly with a Printer POS device 599 using a wireless communication protocol.

Referring now to FIG. 4B, it is seen that a point of sale (POS) device 600, such as a Point of Sale (POS) terminal including an IO controller 602, which is coupled via an IO bus 604 to a USB connector 606, is physically coupled to a device connection cable 610, preferably including an upstream USB connector 612, a USB bus 614 and a downstream USB connector 616. The device connection cable 610 is preferably physically coupled via its downstream USB connector 616 to an upstream USB connector 618 of a first point of sale connection module 620, which is preferably a point of sale connection module 100 (FIG. 1) of the type described hereinabove with reference to FIG. 2A.

A downstream USB connector 622 of first point of sale connection module 620 is physically coupled to an upstream USB connector 624 of a second point of sale connection module 630, which is also preferably a point of sale connection module 100 (FIG. 1) of the general type described hereinabove and is seen to be different from the first point of sale connection module 620.

A downstream USB connector 632 of second point of sale connection module 630 is physically coupled to an upstream USB connector 634 of a third point of sale connection module 640, which is also preferably a point of sale connection module 100 (FIG. 1) of the type described hereinabove and is seen to be different from the first point of sale connection module 620 and from second point of sale connection module 630. Preferably, a downstream USB connector 642 of the third point of sale connection module 640 is covered by a cover element 644, preventing unauthorized access thereto. Alternatively, third point of sale connection module 640 may be formed without a downstream connector 644. It is appreciated that more than three point of sale connection modules may be physically interconnected in this manner or any other suitable manner.

A USB hub 650 of first point of sale connection module 620 is preferably connected via an upstream facing port 652 to upstream USB connector 618 and via a downstream facing port 654 to downstream USB connector 622. Hub 650 is also preferably connected via a downstream facing port 656 to a USB/Serial I/O bridge interface 658 which communicates via a serial connector 659 with a Barcode Reader POS device 660 using a Serial communication protocol.

A USB hub 670 of second point of sale connection module 630 is preferably connected via an upstream facing port 672 to upstream USB connector 624 and via a downstream facing port 674 to downstream USB connector 632. Hub 670 is also preferably connected via a downstream facing port 676 to a USB/Ethernet I/O bridge interface 678 which communicates via an Ethernet connector 679 with a Display POS device 680 using an Ethernet communication protocol.

A USB hub 690 of third point of sale connection module 640 is preferably connected via an upstream facing port 692 to upstream USB connector 634 and via a downstream facing port 694 to downstream USB connector 642. Hub 690 is also preferably connected via a downstream facing port 696 to a USB/Wireless I/O interface 698 which communicates wirelessly with a Printer POS device 699 using a wireless communication protocol.

Referring to FIG. 4C, it is seen that a point of sale (POS) device 700, such as a Point of Sale (POS) terminal including an IO controller 702, which is coupled via an IO bus 704 to an Ethernet connector 706, is physically coupled to a device connection cable 710, preferably including an upstream Ethernet connector 712, an Ethernet bus 714 and a downstream Ethernet connector 716. The device connection cable 710 is preferably physically coupled via its downstream Ethernet connector 716 to an upstream Ethernet connector 718 of a first point of sale connection module 720, which is preferably a point of sale connection module 100 (FIG. 1) of the general type described hereinabove.

An Ethernet hub 730 of first point of sale connection module 720 is preferably connected via an upstream facing port 732 to upstream Ethernet connector 718 and via a downstream facing port 734 to downstream Ethernet connector 735. Hub 730 is also preferably connected via a downstream facing port 736 to an Ethernet/USB I/O bridge interface 737 which communicates via a downstream USB connector 738 with a second point of sale connection module 740 using a USB communication protocol and an upstream USB connector 741 of second point of sale connection module 740. Ethernet connector 735 communicates with Display 739 via Ethernet protocol.

Second point of sale connection module 740, is preferably a point of sale connection module 100 (FIG. 1) of the general type described hereinabove and described hereinabove with reference to FIG. 2A and is seen to be different from the first point of sale connection module 720.

A downstream USB connector 742 of second point of sale connection module 740 is physically coupled to an upstream USB connector 744 of a third point of sale connection module 750, which is also preferably a point of sale connection module 100 (FIG. 1) of the general type described hereinabove and described hereinabove with reference to FIG. 2C and is seen to be different from first point of sale connection module 720 and from second point of sale connection module 740. It is also appreciated that more than three point of sale connection modules may be physically interconnected in this manner or any other suitable manner.

A USB hub 770 of second point of sale connection module 740 is preferably connected via an upstream facing port 772 to upstream USB connector 741 and via a downstream facing port 774 to downstream USB connector 742. Flub 770 is also preferably connected via a downstream facing port 776 to a USB/Serial I/O bridge interface 778, which communicates via a Serial connector 779 with a Barcode Reader POS device 780 using a Serial communication protocol.

A USB hub 790 of third point of sale connection module 750 is preferably connected via an upstream facing port 792 to upstream USB connector 744 and may be connected via a downstream facing port 794 to a downstream USB connector 795. Hub 790 is also preferably connected via a downstream facing port 796 to a USB/Wireless I/O interface 798 which communicates wirelessly with a Printer POS device 799 using a wireless communication protocol.

It will be appreciated by persons skilled in the art that the present invention is not limited by what has been particularly shown and described hereinabove. Rather the scope of the present invention includes modifications and variations of the various features shown or described hereinabove as well as combinations and subcombinations thereof which are not in the prior art.

The invention claimed is:

1. A modular interconnectivity assembly for interconnecting elements of a point of sale system, the modular interconnectivity assembly including:
   at least one interconnectivity module comprising:
      an Input/Output (I/O) hub having at least one upstream facing port and at least two downstream facing ports;
      at least one upstream connector connected to said at least one upstream facing port of said I/O hub and adapted for communication in accordance with a first communication protocol;
      at least one downstream connector connected to at least one of said at least two downstream facing ports and adapted for communication in accordance with said first communication protocol; and
      at least one interface connected to another of said at least two downstream facing ports and adapted for communication in accordance with a second communication protocol, different from said first communication protocol.

2. The modular interconnectivity assembly for interconnecting elements of a point of sale system according to claim 1 and wherein said at least one interface comprises an I/O bridge circuit.

3. The modular interconnectivity assembly for interconnecting elements of a point of sale system according to claim 2 and wherein said I/O bridge circuit is at least one of a USB-Serial bridge circuit, a USB-Ethernet bridge circuit, an Ethernet-Serial bridge circuit and an Ethernet-USB bridge circuit.

4. The modular interconnectivity assembly for interconnecting elements of a point of sale system according to claim 1 and wherein said at least one interface comprises a wireless interface circuit.

5. The modular interconnectivity assembly for interconnecting elements of a point of sale system according to claim 1 and wherein said at least one interconnectivity module comprises at least a first interconnectivity module and a second interconnectivity module which is selectably connected to said first interconnectivity module,
   said first interconnectivity module including:
      a first module Input/Output (I/O) hub having at least one first module upstream facing port and at least two first module downstream facing ports;
      at least one first module upstream connector connected to said at least one first module upstream facing port of said first module I/O hub and adapted for communication in accordance with said first communication protocol;
      at least one first module downstream connector connected to at least one of said at least two first module downstream facing ports and adapted for communication in accordance with said first communication protocol; and
      at least one first module interface including an I/O bridge circuit connected to another of said at least two first module downstream facing ports and adapted for communication in accordance with said second communication protocol, different from said first communication protocol; and
   said second interconnectivity module including:
      a second module Input/Output (I/O) hub having at least one second module upstream facing port and at least two second module downstream facing ports;
      at least one second module upstream connector connected to said at least one second module upstream facing port of said second module I/O hub and adapted for communication in accordance with said first communication protocol;
      at least one second module downstream connector connected to at least one of said at least two second module downstream facing ports and adapted for communication in accordance with said first communication protocol; and
      at least one second module interface, not including an I/O bridge circuit, connected to another of said at least two second module downstream facing ports and adapted for communication in accordance with a third communication protocol, different from said first and second communication protocols.

6. The modular interconnectivity assembly for interconnecting elements of a point of sale system according to claim 1 and wherein said at least one interconnectivity module comprises at least a first interconnectivity module and a second interconnectivity module which is selectably connected to said first interconnectivity module,
   said first interconnectivity module including:
      a first module Input/Output (I/O) hub having at least one first module upstream facing port and at least two first module downstream facing ports;
      at least one first module upstream connector connected to said at least one first module upstream facing port of said first module I/O hub and adapted for communication in accordance with said first communication protocol;
      at least one first module downstream connector connected to at least one of said at least two first module downstream facing ports and adapted for communication in accordance with said first communication protocol; and
      at least one first module interface including an I/O bridge circuit connected to another of said at least two first module downstream facing ports and adapted for communication in accordance with said second communication protocol, different from said first communication protocol; and
   said second interconnectivity module including:
      a second module Input/Output (I/O) hub having at least one second module upstream facing port and at least two second module downstream facing ports;
      at least one second module upstream connector connected to said at least one second module upstream facing port of said second module I/O hub and adapted for communication in accordance with said first communication protocol;
      at least one second module downstream connector connected to at least one of said at least two second module downstream facing ports and adapted for communication in accordance with said first communication protocol; and
      at least one wireless interface connected to another of said at least two second module downstream facing ports.

7. The modular interconnectivity assembly for interconnecting elements of a point of sale system according to claim 1 and wherein said at least one interconnectivity module comprises at least a first interconnectivity module and a second interconnectivity module which is selectably connected to said first interconnectivity module,
   said first interconnectivity module including:

a first module Input/Output (I/O) hub having at least one first module upstream facing port and at least two first module downstream facing ports;

at least one first module upstream connector connected to said at least one first module upstream facing port of said first module I/O hub and adapted for communication in accordance with said first communication protocol;

at least one first module downstream connector connected to at least one of said at least two first module downstream facing ports and adapted for communication in accordance with said first communication protocol; and at least one first module interface including a first type of I/O bridge circuit connected to another of said at least two first module downstream facing ports and adapted for communication in accordance with said second communication protocol, different from said first communication protocol; and said second interconnectivity module including:

a second module Input/Output (I/O) hub having at least one second module upstream facing port and at least two second module downstream facing ports;

at least one second module upstream connector connected to said at least one second module upstream facing port of said second module I/O hub and adapted for communication in accordance with said first communication protocol;

at least one second module downstream connector connected to at least one of said at least two second module downstream facing ports and adapted for communication in accordance with said first communication protocol; and at least one second module interface, including a second type of I/O bridge circuit, different from said first type of I/O bridge circuit, and connected to another of said at least two second module downstream facing ports and adapted for communication in accordance with a third communication protocol, different from said first and second communication protocols.

8. The modular interconnectivity assembly for interconnecting elements of a point of sale system according to claim 1 and wherein said at least one interconnectivity module comprises at least a first interconnectivity module and a second interconnectivity module which is selectably connected to said first interconnectivity module, said first interconnectivity module including:

a first module Input/Output (I/O) hub having at least one first module upstream facing port and at least two first module downstream facing ports;

at least one first module upstream connector connected to said at least one first module upstream facing port of said first module I/O hub and adapted for communication in accordance with said first communication protocol;

at least one first module downstream connector connected to at least one of said at least two first module downstream facing ports and adapted for communication in accordance with said first communication protocol; and at least one first module interface including a first type of I/O bridge circuit connected to another of said at least two first module downstream facing ports and adapted for communication in accordance with said second communication protocol, different from said first communication protocol; and said second interconnectivity module including:

a second module Input/Output (I/O) hub having at least one second module upstream facing port and at least two second module downstream facing ports;

at least one second module upstream connector connected to said at least one second module upstream facing port of said second module I/O hub and adapted for communication in accordance with said second communication protocol;

at least one second module interface connector connected to at least one of said at least two second module downstream facing ports and adapted for communication in accordance with said second communication protocol; and at least one second module interface, including a second type of I/O bridge circuit, different from said first type of I/O bridge circuit, and connected to another of said at least two second module downstream facing ports and adapted for communication in accordance with a third communication protocol, different from said first and second communication protocols.

9. The modular interconnectivity assembly for interconnecting elements of a point of sale system according to claim 1 and wherein said first communication protocol is one of a USB communication protocol and an Ethernet communication protocol.

10. The modular interconnectivity assembly for interconnecting elements of a point of sale system according to claim 9 and wherein said second communication protocol is one of a serial communication protocol, a USB communication protocol, an Ethernet communication protocol, a Tailgate communication protocol, an SPI communication protocol, an I2C communication protocol, a WiFi communication protocol and a Bluetooth communication protocol.

11. A point of sale system comprising:

a point of sale terminal communicating with a first communication protocol;

at least one point of sale device other than a point of sale terminal communicating with a second communication protocol;

a modular interconnectivity assembly interconnecting said point of sale terminal and said at least one point of sale device, said modular interconnectivity assembly comprising:

at least one interconnectivity module comprising:

an Input/Output (I/O) hub having at least one upstream facing port and at least two downstream facing ports;

at least one upstream connector connected to said at least one upstream facing port I/O hub and adapted for communication in accordance with said first communication protocol;

at least one downstream connector connected to at least one of said at least two downstream facing ports and adapted for communication in accordance with said first communication protocol; and at least one interface connected to another of said at least two downstream facing ports and adapted for communication in accordance with said second communication protocol, different from said first communication protocol.

12. The point of sale system according to claim 11 and wherein said at least one interface comprises an I/O bridge circuit.

13. The point of sale system according to claim 12 and wherein said I/O bridge circuit is at least one of a USB- Serial bridge circuit, a USB-Ethernet bridge circuit, an Ethernet-Serial bridge circuit and an Ethernet-USB bridge circuit.

14. The point of sale system according to claim 11 and wherein said at least one interface comprises a wireless interface circuit.

15. The point of sale system according to claim 11 and wherein said at least one interconnectivity module comprises at least a first interconnectivity module and a second interconnectivity module which is selectable connected to said first interconnectivity module, said first interconnectivity module including:
- a first module Input/Output (I/O) hub having at least one first module upstream facing port and at least two first module downstream facing ports;
- at least one first module upstream connector connected to said at least one first module upstream facing port of said first module I/O hub and adapted for communication in accordance with said first communication protocol;
- at least one first module downstream connector connected to at least one of said at least two first module downstream facing ports and adapted for communication in accordance with said first communication protocol; and
- at least one first module interface including an I/O bridge circuit connected to another of said at least two first module downstream facing ports and adapted for communication in accordance with said second communication protocol, different from said first communication protocol; and said second interconnectivity module including:
- a second module Input/Output (I/O) hub having at least one second module upstream facing port and at least two second module downstream facing ports;
- at least one second module upstream connector connected to said at least one second module upstream facing port of said second module I/O hub and adapted for communication in accordance with said first communication protocol;
- at least one second module downstream connector connected to at least one of said at least two second module downstream facing ports and adapted for communication in accordance with said first communication protocol; and
- at least one second module interface, not including an I/O bridge circuit, connected to another of said at least two second module downstream facing ports and adapted for communication in accordance with a third communication protocol, different from said first and second communication protocols.

16. The point of sale system according to claim 11 and wherein said at least one interconnectivity module comprises at least a first interconnectivity module and a second interconnectivity module which is selectable connected to said first interconnectivity module, said first interconnectivity module including:
- a first module Input/Output (I/O) hub having at least one first module upstream facing port and at least two first module downstream facing ports;
- at least one first module upstream connector connected to said at least one first module upstream facing port of said first module I/O hub and adapted for communication in accordance with said first communication protocol;
- at least one first module downstream connector connected to at least one of said at least two first module downstream facing ports and adapted for communication in accordance with said first communication protocol; and
- at least one first module interface including an I/O bridge circuit connected to another of said at least two first module downstream facing ports and adapted for communication in accordance with said second communication protocol, different from said first communication protocol; and said second interconnectivity module including:
- a second module Input/Output (I/O) hub having at least one second module upstream facing port and at least two second module downstream facing ports;
- at least one second module upstream connector connected to said at least one second module upstream facing port of said second module I/O hub and adapted for communication in accordance with said first communication protocol;
- at least one second module downstream connector connected to at least one of said at least two second module downstream facing ports and adapted for communication in accordance with said first communication protocol; and
- at least one wireless interface connected to another of said at least two second module downstream facing ports.

17. The point of sale system according to claim 11 and wherein said at least one interconnectivity module comprises at least a first interconnectivity module and a second interconnectivity module which is selectably connected to said first interconnectivity module, said first interconnectivity module including:
- a first module Input/Output (I/O) hub having at least one first module upstream facing port and at least two first module downstream facing ports;
- at least one first module upstream connector connected to said at least one first module upstream facing port of said first module I/O hub and adapted for communication in accordance with said first communication protocol;
- at least one first module downstream connector connected to at least one of said at least two first module downstream facing ports and adapted for communication in accordance with said first communication protocol; and
- at least one first module interface including a first type of I/O bridge circuit connected to another of said at least two first module downstream facing ports and adapted for communication in accordance with said second communication protocol, different from said first communication protocol; and said second interconnectivity module including:
- a second module Input/Output (I/O) hub having at least one second module upstream facing port and at least two second module downstream facing ports;
- at least one second module upstream connector connected to said at least one second module upstream facing port of said second module I/O hub and adapted for communication in accordance with said first communication protocol;
- at least one second module downstream connector connected to at least one of said at least two second module downstream facing ports and adapted for communication in accordance with said first communication protocol; and
- at least one second module interface, including a second type of I/O bridge circuit, different from said first type of I/O bridge circuit, and connected to another of said at least two second module downstream facing ports and adapted for communication in accordance with a third communication protocol, different from said first and second communication protocols.

18. The point of sale system according to claim 11 and wherein said at least one interconnectivity module comprises at least a first interconnectivity module and a second interconnectivity module which is selectably connected to said first interconnectivity module, said first interconnectivity module including:
- a first module Input/Output (I/O) hub having at least one first module upstream facing port and at least two first module downstream facing ports;
- at least one first module upstream connector connected to said at least one first module upstream facing port of said first module I/O hub and adapted for communication in accordance with said first communication protocol;
- at least one first module downstream connector connected to at least one of said at least two first module downstream facing ports and adapted for communication in accordance with said first communication protocol; and
- at least one first module interface including a first type of I/O bridge circuit connected to another of said at least two first module downstream facing ports and adapted for communication in accordance with said second communication protocol, different from said first communication protocol; and said second interconnectivity module including:
- a second module Input/Output (I/O) hub having at least one second module upstream facing port and at least two second module downstream facing ports;
- at least one second module upstream connector connected to said at least one second module upstream facing port of said second module I/O hub and adapted for communication in accordance with said second communication protocol;
- at least one second module downstream connector connected to at least one of said at least two second module downstream facing ports and adapted for communication in accordance with said second communication protocol; and
- at least one second module interface, including a second type of I/O bridge circuit, different from said first type of I/O bridge circuit, and connected to another of said at least two second module downstream facing ports and adapted for communication in accordance with a third communication protocol, different from said first and second communication protocols.

19. The point of sale system according to claim 1 and wherein said first communication protocol is one of a USB communication protocol and an Ethernet communication protocol.

20. The point of sale system according to claim 19 and wherein said second communication protocol is one of a serial communication protocol, a USB communication protocol, an Ethernet communication protocol, a Tailgate communication protocol, an SPI communication protocol, an I2C communication protocol, a WiFi communication protocol and a Bluetooth communication protocol.

* * * * *